US011846228B2

(12) United States Patent
Northington

(10) Patent No.: US 11,846,228 B2
(45) Date of Patent: Dec. 19, 2023

(54) PRE-COMBUSTION CHAMBER APPARATUS AND METHOD FOR PRE-COMBUSTION

(71) Applicant: Tracy Northington, Corrales, NM (US)

(72) Inventor: Tracy Northington, Corrales, NM (US)

( * ) Notice: Subject to any disclaimer, the term of this patent is extended or adjusted under 35 U.S.C. 154(b) by 0 days.

(21) Appl. No.: 18/159,620

(22) Filed: Jan. 25, 2023

(65) Prior Publication Data

US 2023/0167763 A1 Jun. 1, 2023

Related U.S. Application Data

(63) Continuation of application No. 17/720,456, filed on Apr. 14, 2022, now Pat. No. 11,591,951, which is a continuation of application No. 17/384,468, filed on Jul. 23, 2021, now Pat. No. 11,313,270, which is a continuation of application No. 16/893,027, filed on Jun. 4, 2020, now Pat. No. 11,118,498, which is a continuation of application No. 14/834,401, filed on Aug. 24, 2015, now abandoned.

(60) Provisional application No. 62/041,058, filed on Aug. 23, 2014.

(51) Int. Cl.
| F02B 19/16 | (2006.01) |
| F16J 15/06 | (2006.01) |
| F16J 15/02 | (2006.01) |

(52) U.S. Cl.
CPC ........... *F02B 19/165* (2013.01); *F16J 15/022* (2013.01); *F16J 15/061* (2013.01); *F16J 15/062* (2013.01)

(58) Field of Classification Search
CPC ......... F02B 19/16; F02B 19/165; F16J 15/02; F16J 15/022; F16J 15/06; F16J 15/061; F16J 15/062
See application file for complete search history.

(56) References Cited

U.S. PATENT DOCUMENTS

| 3,463,056 | A | 8/1969 | Fangman |
| 5,555,867 | A | 9/1996 | Freen |
| 6,843,220 | B2 | 1/2005 | LAusch |
| 9,856,848 | B2 | 1/2018 | Chiera |
| 11,118,498 | B2 | 9/2021 | Northington |
| 2009/0309475 | A1* | 12/2009 | Tozzi ..................... H01T 13/54 313/143 |
| 2013/0139784 | A1 | 6/2013 | Pierz |
| 2014/0165958 | A1 | 6/2014 | Lee |
| 2015/0068489 | A1 | 3/2015 | Bunce |
| 2015/0267631 | A1 | 9/2015 | Miyamoto |
| 2016/0010538 | A1 | 1/2016 | Suzuki |
| 2016/0047323 | A1 | 2/2016 | Suzuki |
| 2016/0237879 | A1 | 8/2016 | Rowan |
| 2016/0237971 | A1 | 8/2016 | Rowan |
| 2016/0319791 | A1 | 11/2016 | Willi |
| 2016/0326946 | A1 | 11/2016 | Willi |

(Continued)

*Primary Examiner* — John Kwon
*Assistant Examiner* — Johnny H Hoang
(74) *Attorney, Agent, or Firm* — V Gerald Grafe

(57) ABSTRACT

Embodiments of the present invention provide a pre-combustion chamber assembly, comprising (a) a body, having a cylindrical end portion having a step-wise increase in diameter forming a sealing surface for sealing to an engine; (b) a tip, with a hollow shaft in fluid communication with a combustion region of the tip, where the shaft has a first shaft diameter that allows the shaft to be slid over a portion of the body; (c) a gasket mounted about the body and resting against the sealing surface, wherein the gasket comprises a wire wound washer.

13 Claims, 26 Drawing Sheets

(56) References Cited

U.S. PATENT DOCUMENTS

2020/0370465 A1 11/2020 Northington
2021/0348545 A1 11/2021 Northington
2022/0282662 A1  9/2022 Northington

* cited by examiner

Tip to chamber replacement material suggestions

First step - select materials with maximum service temperature >400F
Second step - select materials with lower modulus and higher yield strength than current material (yelow)

Third step - check toughness and maximum service temperature - all proposed materials have similar or higher toughness and higher temperature tolerance.

PRE-COMBUSTION CHAMBER APPARATUS AND METHOD FOR PRE-COMBUSTION

CROSS-REFERENCE TO RELATED APPLICATIONS

This application is a continuation of U.S. application Ser. No. 17/720,456, filed 31 May 2022, which was a continuation in part of U.S. application Ser. No. 17/384,468, filed Jul. 23, 2021, which was a continuation of U.S. application Ser. No. 16/893,027, filed Jun. 4, 2020, which is a continuation of U.S. application Ser. No. 14/834,401, filed Aug. 24, 2015, and thence to U.S. Provisional Application No. 62/041,058 filed Aug. 23, 2014, each of which is incorporated by reference herein and made part of this specification.

BACKGROUND OF THE INVENTION

Field of the Invention (Technical Field)

The present invention relates to a seal apparatus and method of sealing a pre-combustion chamber comprising an improved sealing apparatus and an improved seal material. The several embodiments of the present invention are disposed at both the combustion seal and the water jacket seal.

Currently used pre-combustion chamber assemblies are composed of a detachable tip (the pre-combustion chamber) that is sealed to a pre-combustion chamber body where the two parts (tip and body) mate, using a flat washer type seal. The tip's function is to initiate the combustion cycle in the engine cylinder. The flame front is ignited in the rich environment of the tip and expands through holes in the tip to ignite the fuel in the leaner cylinder combustion chamber environment. Due to seal failures, the Office of Environmental Management and others have started welding the tip to the body as a method to eliminate seal leaks at the water jacket seal.

Currently some natural gas engines utilize a pre-combustion chamber to start combustion in a relatively rich environment so that the flame front can propagate in the leaner cylinder environment. Material compatibility and durability issues related to cyclic temperature and pressure changes in pre-combustion chambers are problematic. In addition to the material for the seals themselves, the materials used for the tip, chamber, and check valve may also fail.

Sealing surfaces of mating parts should have a good finish and as flat a surface as reasonably achievable to provide better sealing. Plating the sealing surfaces in a soft material such as copper may provide a lower leak rate while requiring a less tight surface finish and a lower flatness tolerance, depending on the material chosen for the seal.

Two important parameters affecting the quality of a seal obtained are surface finish and flatness of the faces in contact with the seal. A poor surface finish can provide leak paths past the seal, particularly if tool marks produced by machining are radial rather than circumferential. Likewise, a surface with poor flatness (i.e. wavy) presents a leak path if deflection of the seal material does not fill the voids.

Currently used devices use copper-nickel metal gaskets to improve the seals. However, the present invention comprises engineered metal seals and alternately comprises an internal energized spring. The present invention comprises these special geometry seals made from Inconel, titanium and/or hastalloy seals that withstand the high temperature and the high cyclic pressures of combustion. The tip is currently made of Inconel alloy 625, and the seals currently in use are made of copper or copper nickel alloys and are of a flat washer type design.

The present invention provides for improvements to seal geometry and tolerances, improved seal materials, and superior seal production. The present invention provides improved tip surface finish and flatness achieved in the machining operation, thus providing a better sealing surface where the tip seals to the combustion chamber.

The present invention provides for movement of the tip and body mating parts and allows for movement of the seal without leaking.

One embodiment of the present invention provides for sealing on the axial surfaces of the tip and body instead of the face of the tip and body by a flat washer type seal, as is currently done.

One embodiment of the present invention provides for sealing on the face of the tip to body connection, using an engineered metal seal with or without an energized internal spring.

The present invention provides the ability for the tip and seal connection to continue to seal under the repeated hammering of the combustion cycle, and will accommodate this at higher temperatures and pressures than the current pre-combustion chamber design. The new seal is designed to slide
   along the axial connection of the tip to the body, so that as hammering forces are applied the seal is not damaged as is the currently used flat washer type seal.

The present invention also provides for a new and improved geometry of both the pre-combustion chamber tip and pre-combustion body wherein a spring energized c-ring seal is disposed in the energized metal seal. The present invention comprises a preferred embodiment and alternative embodiments comprising spring energized seals of a plurality of geometries, including the "C" ring geometry.

One embodiment of the present invention comprising a seal provides for a face to face seal that seals the end face of the tip to the mating face of the body where the parts join. One embodiment of the present invention comprising a seal provides for a seal that seals the outside diameter of the body to the inside diameter of the tip where the parts mate.

The present invention provides for a replacement pre-combustion chamber with a detachable tip which can be replaced separately, drastically lowering the overall cost to users. The present invention provides for a replacement chamber comprising an improved part geometry, improved materials selection and gasket/sealing surface design.

The present invention provides for a replacement chamber with increased reliability of the tip-to-body-seal, comprising both improvements to the existing seal design for better performance, also applicable to the tip to combustion chamber seal, as well as to modify the tip and chamber body design wherein a more robust type of seal is disposed.

The apparatus and method of the present invention overcomes the deficiencies of the devices and methods currently used because the method is straightforward and elegant and results in significantly improved performance of the pre-combustion chamber. The apparatus and method of the present invention comprises an engineered metal seal with optional installed spring energized seal disposed axially or alternately in a full groove disposed in the pre-ignition chamber body and/or tip, with additional changes made to certain part configurations to enhance performance of the combustion chamber.

This apparatus may also be applied to the combustion seal, where the Tip enters the main engine combustion chamber (engine cylinder). In this application, the present invention would seal the outside diameter of the Tip to the inside diameter of the main combustion chamber, or alternately be placed in a groove on the face of the Tip combustion seal surface and would mate to the current in use combustion seal surface on the main combustion chamber. The size of the seal and location may vary.

In summary, the present invention provides for a modified tip to chamber body seal comprising modification of the interface between the tip and chamber body to accept a spring energized C-ring seal that results in a reduced leak rate.

SUMMARY OF THE INVENTION

Embodiments of the present invention provide a pre-combustion chamber assembly, comprising (a) a body, having a cylindrical end portion having a step-wise increase in diameter forming a sealing surface for sealing to an engine; (b) a tip, with a hollow shaft in fluid communication with a combustion region of the tip, where the shaft has a first shaft diameter that allows the shaft to be slid over a portion of the body; (c) a gasket mounted about the body and resting against the sealing surface, wherein the gasket comprises a wire wound washer.

Embodiments of the present invention provide a pre-combustion chamber assembly comprising a body shaft, a tip, a seal disposed on axial surfaces of said tip and said body shaft, and a groove disposed in said body shaft, wherein the seal comprises an engineered metal seal, an engineered metal seal with an energized spring, or a face style engineered metal seal and an energized spring. Insertion of the tip is aligned by the presence and orientation of the groove.

The engineered metal seal comprises a material including Inconel, hastelloy, or titanium alloys. The axial surface on the outer diameter of the body shaft comprises a plurality of tapers.

Embodiments of the present invention provide a method for sealing pre-combustion chamber assembly comprising disposing a groove in a pre-combustion chamber, inserting a seal comprising an engineered metal seal in the groove, and improving the geometry and tolerances of the ignition pre-chamber.

Such methods can further comprise disposing the seal against the radial surface of the body shaft and the tip. Such methods can further comprise aligning and seating the seal. Aligning the seal comprises disposing an engineered metal seal along the body shaft wherein the body shaft comprises increasing diameters by providing tapered sections.

Such methods can further comprise expanding the seal against the body shaft, increasing the pressure of the seal at one face of the body shaft, and thus increasing sealing properties.

BRIEF DESCRIPTION OF THE SEVERAL VIEWS OF THE DRAWINGS

The accompanying drawings in the attachment, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention.

FIG. 4 comprises two views illustrating an embodiment of the present invention.

DETAILED DESCRIPTION OF THE INVENTION

The present invention addresses and improves on deficiencies in devices currently used. Currently, seals disposed between the tip and the base of the combustion chamber leak and therefore either fail completely or a complete burn is not achieved. Natural gas mixes with coolant if the seal between the glycol coolant area and the combustion chamber leaks.

This mixture burns at a higher temperature, resulting in materials performance issues, causing the seals to work less efficiently, reducing tip life, and leading to potential catastrophic failure. The present invention provides an improved seal that overcomes the following deficiencies. Seals made of soft material plastically deform due to cyclic loading of combustion pressure and thermal cycling, creating leak paths. Seals made of hard materials do not seal. Surface imperfections provide leak paths and potential uneven seating load.

The present invention provides for an improved seal design for the tip to chamber body seal comprising a plurality of Engineered Metal Seals with optional energized springs. These seals may be configured to be used either axially or as face seals. The preferred embodiment is a C-ring geometry consisting of a plated 'C' shaped metal jacket over a close-wound helical spring coil core. The spring and jacket are made of a high temperature, high strength alloy such as Inconel Alloy 625, Alloy 718, or or Alloy X750, or Hastelloy or Rene 41 or other such high temperature materials, and the jacket is plated with a soft material such as silver or copper or gold. The plating provides a ductile outer layer to fill surface imperfections and the jacket material, internal spring, and gas pressure force provide a high seating force with good elasticity. The present invention comprises an improved seal and a modification of the mating parts geometry, making adjustments to improve the performance of existing metal seal. The plating also provides for an inert metal covering on the seal to reduce carbon and other deposit build up due to the reaction between the sulfur typically found in natural gas and the unplated metals.

The spring coils work independently of one another so slight deviations in surface flatness are tolerated. The seals are installed with a deflection-limiting feature configured similar to an O-ring groove, resulting in loading beyond the seating load of the seal being carried by the mating parts, and not the seal itself.

The placement and design of pre-combustion chambers currently used in engines are susceptible to impact forces that are created when combustion occurs inside the piston. This combustion explosion causes forces to be transmitted back against the pre-combustion chamber and results in significant impact to the seal and mating seal surfaces currently used. This results in deformation of the seal and or seal surfaces, leading to loss of compression at the seal surface, and leaks. Both embodiments of the present invention overcome these deficiencies.

Figure 1:
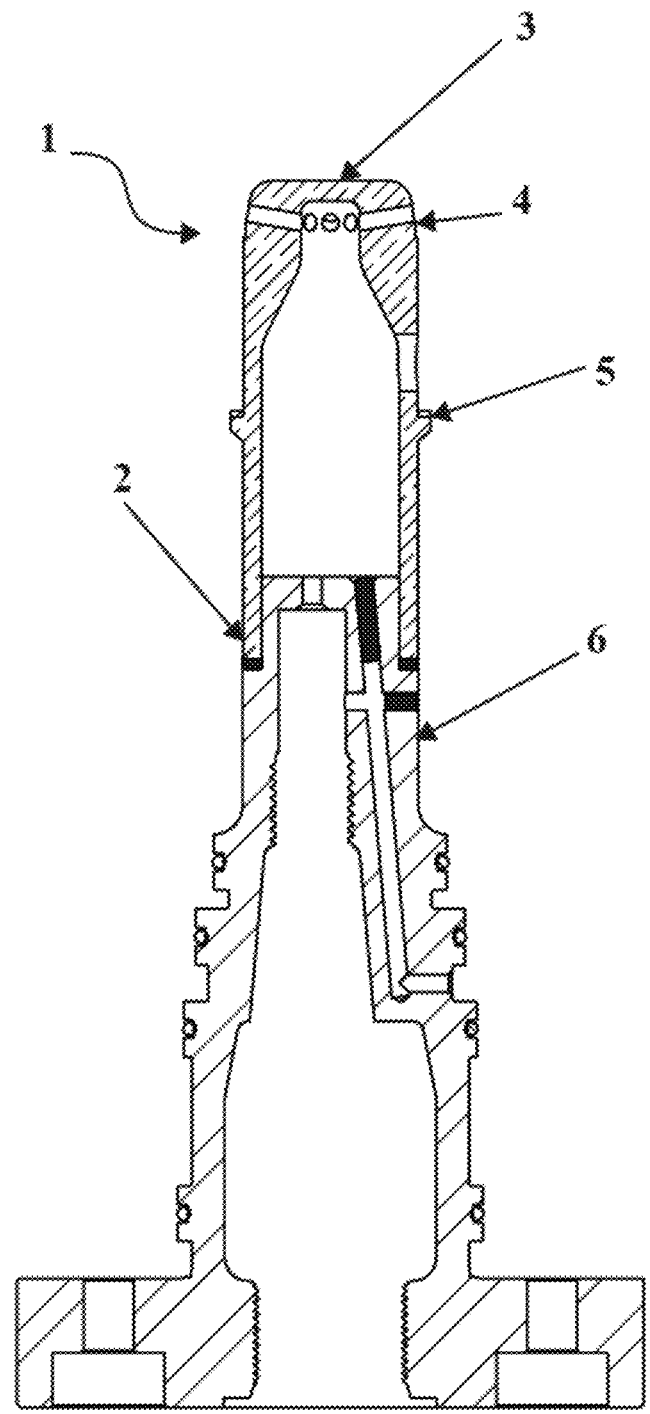
FIG. 1 is a cross section view of the preferred embodiment of the pre-combustion chamber.

We refer now to the figures. FIG. 1 is a cross section view of one embodiment of a pre-combustion chamber assembly, comprising flat washer type seal 2. Pre-combustion chamber assembly 1 also comprises tip 4 and body 6. The method of assembly of the pre-combustion chamber assembly comprises the following steps. The washer type seal slides over the body shaft and the tip then slides over the body shaft. The face of the tip and the body shaft are sealed when the assembly is installed in the engine. Two bolts are used to apply pressure from the back end of the pre-combustion chamber, pressing the assembly against the combustion seal surface of the main combustion chamber. During this process the tip and body face are squeezed together forming a seal between the tip and body shaft. Pressurized natural gas is injected into the pre-combustion chamber and separately into the engine cylinder. A spark plug provides the initial ignition to the gas inside the pre-combustion chamber. When the gas in the pre-combustion chamber is ignited, flame shoots out the the end of the pre-combustion chamber tip and into the main combustion chamber, causing cylinder combustion.

The force of detonation is transmitted back to the pre-combustion chamber and its components including the seals.

In FIG. 1, lip 5 is disposed on tip 4, comprising the maximum diameter that fits into a cylinder. Surface 3 is the end of body 6. A more detailed description of this embodiment of the present invention will be found after the description of the preferred embodiment which follows immediately herein.

Figure 2:
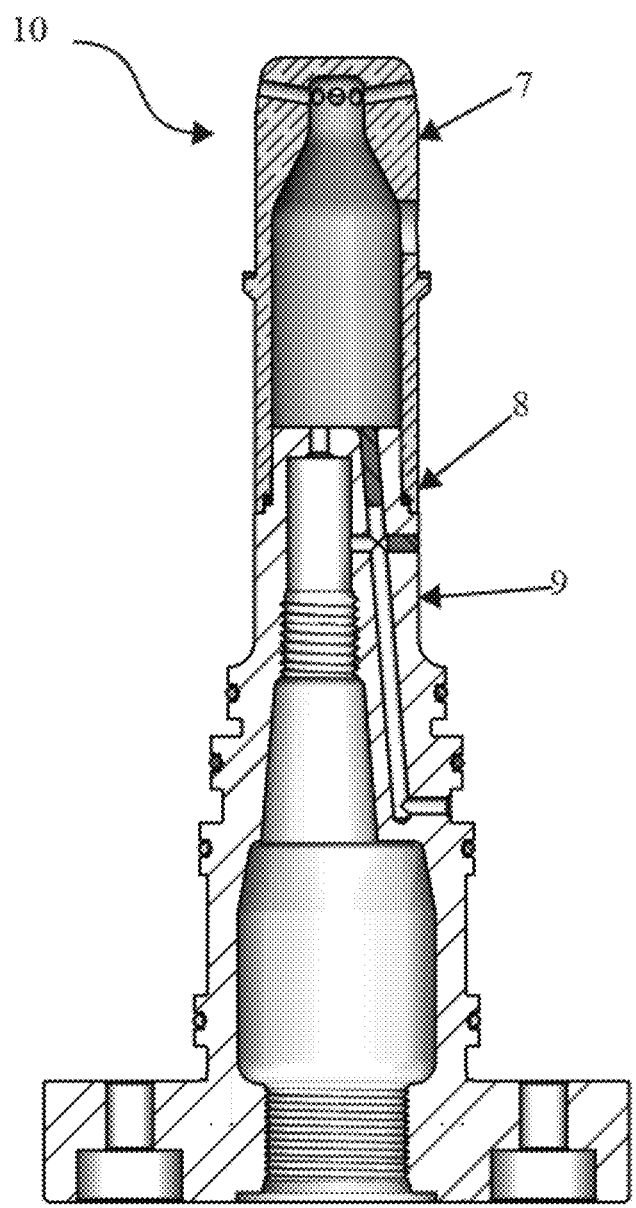
FIG. 2 is a side view of the pre-combustion chamber assembly of the present invention.

FIG. 2 is a cross section side view of the preferred embodiment of the pre-combustion chamber assembly of the present invention. This preferred embodiment of the pre-combustion chamber assembly 10 comprises engineered metal seal 8, body 9, tip 7, and engineered metal radial shaft seal 8. This preferred embodiment of the present invention comprises three embodiments of engineered metal seals all of which provide a method of sealing that is an improvement over the sealing presently known. Two of the seal embodiments comprise engineered metal radial shaft seal 8 comprising engineered metal seal with energized spring 34 illustrated in FIG. 7 and engineered metal seal 35 illustrated in FIG. 6. The present invention also comprises face style engineered metal seal with energized spring 47 shown in FIG. 14.

The preferred embodiment of the present invention comprises a modification of the interface configuration between the tip and the chamber body that is currently used in order to house the spring energized C-ring seal that results in improved performance and longevity. Ductile plating material, such as copper, fills surface imperfections while the spring, jacket, and pressure forces provide a high elastic seating load, resulting in a resilient seal with a low leak rate. The preferred embodiment seal of the present invention is less susceptible to cyclic loading than a sealing washer since the seal is disposed and contained within a groove, as long as deflection of the groove is kept to a minimum. The current invention comprises a design that incorporates the groove into the pre-ignition chamber body. Stress analysis results indicate that this configuration is strong enough to perform with the clamping load and cyclic combustion chamber pressure force expected.

The preferred embodiment is the "C" geometry, axial type seal with or without internal energized spring. The present invention comprises a modification of the interface configuration between the tip and the chamber body that is currently used in order to house the C-ring seal that results in improved performance and longevity. Ductile plating material, such as copper, silver or gold fills the surface imperfections while the spring, jacket, and pressure forces of combustion provide a high elastic seating load, resulting in a resilient seal with a low leak rate. The seal of the present invention is less susceptible to cyclic loading than a sealing washer since the engineered metal seal is designed to accept movement, and will not deform under the loads and pressures applied on the pre-combustion chamber, during engine operation, as does the current seal.

For face to face type seals, the current invention comprises a design that incorporates a groove into the pre-ignition chamber body. Stress analysis results indicate that this configuration is strong enough to perform with the clamping load and cyclic combustion chamber pressure force expected.

Figure 3:
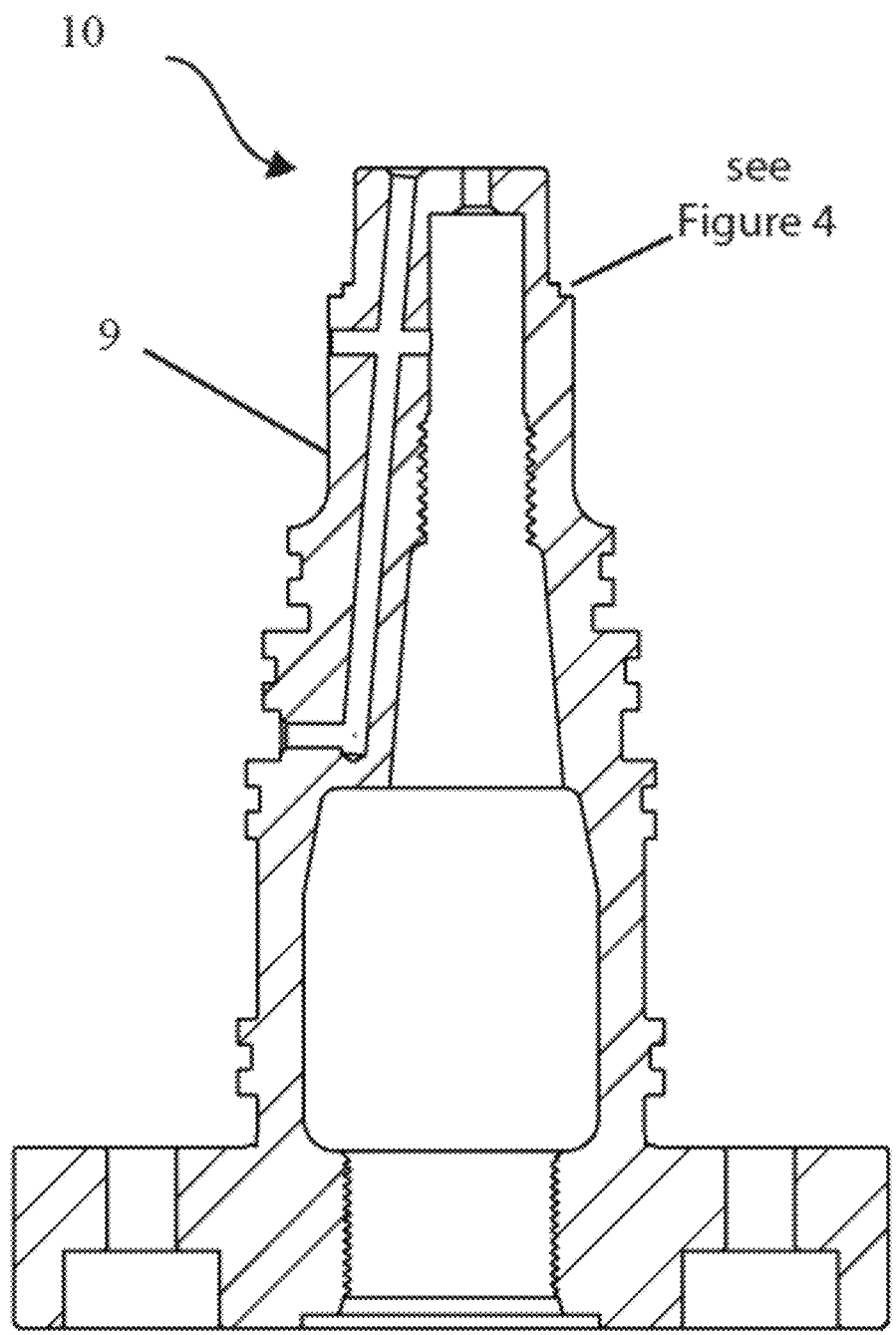
FIG. 3 is a cross-section view of an alternate embodiment of the pre-combustion chamber assembly of the present invention.
Figure 4A:
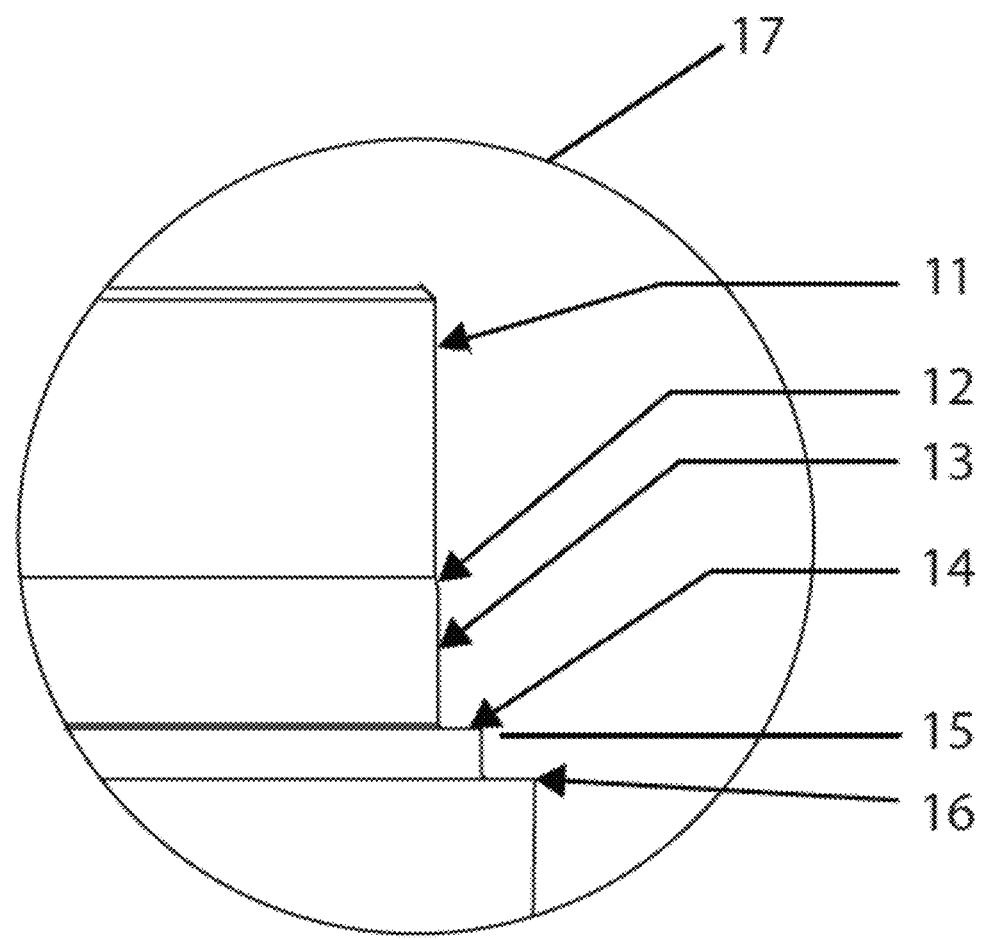
FIG. 4A is a detail view illustrating an enlarged view of the body shaft shown in FIG. 3.

FIG. 3 is a cross-section view of the embodiment of the pre-combustion chamber assembly of the present invention shown in FIG. 2, illustrating the pre-combustion chamber body 9 with no tip 7 or engineered metal seal 8 installed. The area 17 where engineered metal seal 8 is installed is shown in FIG. 4A. This is an example of the machining required on the body for the installation of a "C" style engineered metal seal, the preferred embodiment. This figure shows in more detail where on the body the seal is installed. This is a view of the preferred embodiment of the invention.

FIG. 4A is a detail view illustrating an enlarged view of the body shaft shown in FIG. 3 in the area marked "FIG. 4." FIG. 4A shows a portion of pre-combustion chamber body shaft 17 comprising engineered metal seal 8 and tip 7 and illustrating the installation of a plurality of elements and the design of this portion of the present invention. All surfaces of body shaft 17 are smooth, straight, round, and perpendicular to the centerline of body 9. In the construction of the present invention, tooling marks are radial to the diameter of the body shaft, and the machining surface finish is a minimum of 32 root mean square (RMS.)

The diameter of body shaft 11 is a maximum 0.013 inches less that the inside diameter of whatever seal is used. Thus, engineered metal seal 8 easily slides onto the body shaft. The designed fit is sufficiently close ensuring that the engineered metal seal remains adequately perpendicular to the body shaft, insuring a proper fit and alignment of the engineered metal seal during the initial phase of installation.

As engineered metal seal 8 installation is disposed along body shaft 17, the body shaft diameter increases due to the disposition of taper area 12 comprising a taper of 0.040 by 15 degrees. Taper area 12 is a transition to surface of body shaft 13, providing for incremental tightening of the fit between the body shaft and engineered metal seal 8, which provides a mechanism to maintain alignment and perpendicularity of engineered metal seal 8 related to body shaft 17 as installation progresses.

The outside diameter of the body shaft comprises the surface where engineered metal seal 8 is ultimately seated. This diameter is 1.479-1.489 inches and said dimension is tightly controlled. At this point the body shaft diameter at body shaft radial surface 13 is larger than inside diameter 37 (shown in FIG. 8) of engineered metal seal 8 thus providing for both "C" geometrical shape 38 (shown in FIG. 9) of engineered metal seal 8 and providing for the designed spring temper of the engineered metal seal to be interference fitted over body shaft 13 with a specific designed force value.

Engineered metal seal 8 and the design of engineered metal seal 8 provides spring tension against body shaft radial surface 13 and also against tip diameter 24 where engineered metal seal 8 mates to tip 7. Sealing assembly mechanism 44 (shown in FIG. 11) thus provides better sealing properties for the pre-combustion chamber's exposure to severe operating conditions. The seal is properly spring tempered, and the material of engineered metal seal 8 withstands the extreme operating temperatures, combustion pressure, and repeated combustion shock (i.e. hammering) that are experienced during normal engine operation.

The bottom radius of the "C" of engineered metal seal 8 seats at one bottom area of body shaft surface 13. Body shaft 17 comprises another radius provided by machining into face 14, where engineered metal seal comprising "C" geometrical shape 38 seats. Thus, the preferred embodiment of the present invention provides for the proper seating and alignment of engineered metal seal 8.

Additional sealing surface area where the bottom of engineered metal seal 8 seats to body shaft 17 is provided at face 14. The method of use of the present invention provides, during combustion, the force of combustion gases to impact the open end of "C" element 23 (shown in FIG. 5) of engineered metal seal 8, thus disposing the sides and the bottom radius of engineered metal seal 8 to expand against the sealing surfaces of body shaft 17 at body shaft radial surface 13, thus increasing pressure of engineered metal seal 8 against body shaft radial surface 13 at the bottom of the body shaft at face 14 to increase the sealing properties of the mechanism. The configuration of the present invention provides for retention of engineered metal seal 8 to body shaft 17 during removal of tip 7 during any subsequent tip 7 and seal 8 replacement.

Area 15 of body shaft 17 comprises a 0.005 radius that blends into the 1.646-1.649 diameter of body shaft 17 providing a smooth fit of tip 7 to body 9. The present invention comprises 0.005 inches of clearance between body shaft 17 and tip 9, ensuring proper alignment during installation, and ensuring installation of tip 9 in a downward disposition, and also insuring that the tip does not damage engineered metal seal 8 during installation of tip 9 over engineered metal seal 8. The geometry of tip 7 is also similarly designed and is illustrated in FIG. 4B.

Seating surface 16 comprises a face of tip 7 that is disposed adjacent to the face of body shaft 17. The present invention provides a precise vertical fit of tip 7 to body 9 (vertically) providing a properly located and aligned disposition of engineered metal seal 8 to both body 9 and tip 7.

Sealing assembly mechanism 44 (shown in FIG. 11) comprising engineered metal seal 8 and body shaft 17 provides adequate movement during operation and also maintains an adequate seal. The fit combined with the specified dimensions and tolerances of the present invention, results in a significantly improved sealing mechanism and improved life of the seal in all operating conditions. A cross section view of the assembly of tip 7, engineered metal seal 8, and body 9 is shown in FIG. 5.

Figure 4B:
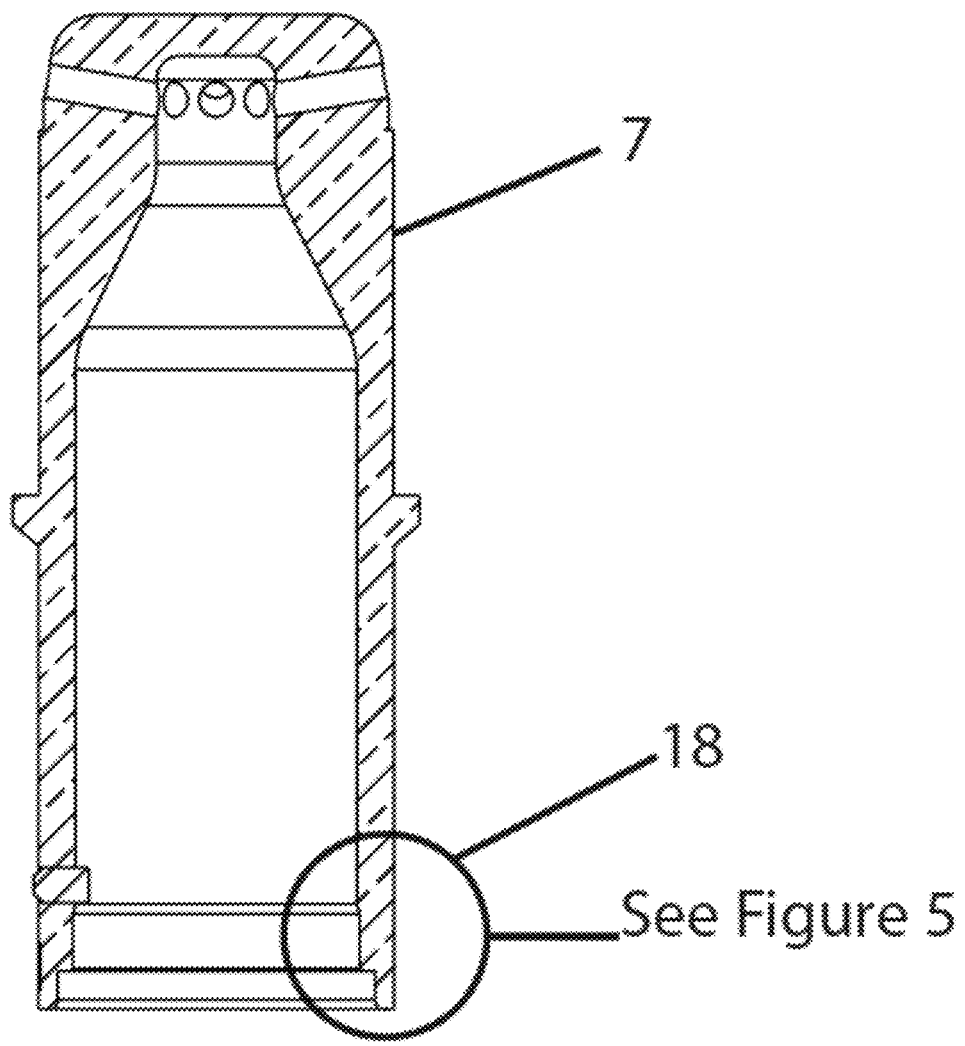
FIG. 4B is a cross section view of the tip element of the alternate embodiment of the pre-combustion chamber assembly of the present invention illustrated in FIG. 3.

FIG. 4B is a cross section view of the tip element of the alternate embodiment of the pre-combustion chamber assembly of the present invention illustrated in FIG. 3. This view shows a cross section view of tip 7. The encircled area 18 is shown as a detail view in FIG. 5.

Figure 5:
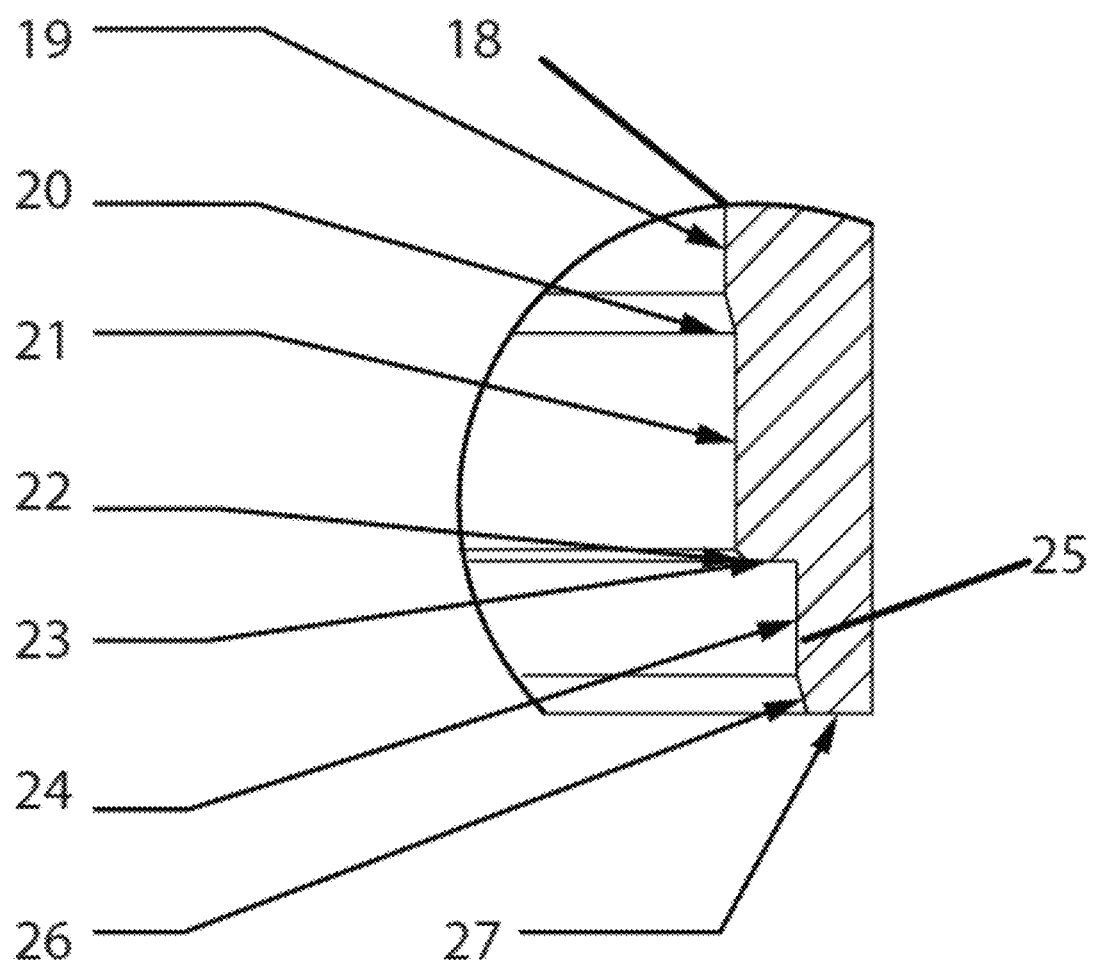
FIG. 5 is a detail view of the tip element sealing surfaces illustrated in FIGS. 4A and 4B.
Figure 11:
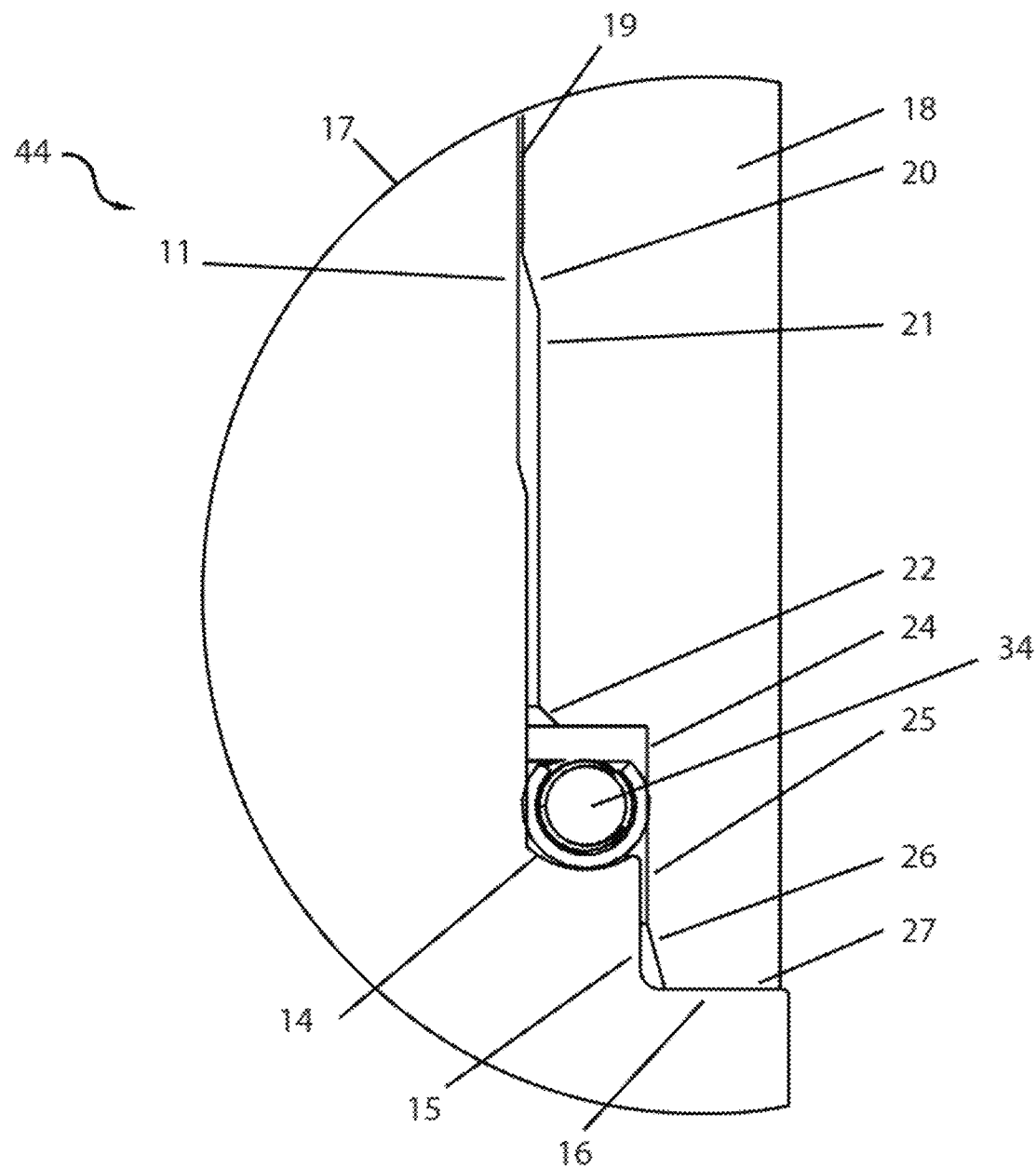
FIG. 11 is a cross section view of the seal assembly of the present invention.

FIG. 5 is a detail view of area 18 enlarging the area shown in FIG. 48 in order to see details. This figure shows a cross section view of tip 7 illustrating how tip 7 is aligned with and disposed on engineered metal seal 8 and body shaft 17. A detailed cross section view of seal assembly mechanism 44 comprising tip 7, body 9, and engineered metal seal 8 are illustrated in FIG. 11. Tapered relief cut 20 is provided so that when tip 7 is disposed on body shaft 17, this feature provides for tip 7 to align with body shaft 17. Area 21 is a tightly controlled dimensional relief providing for easy installation of tip 7 to body 9, while maintaining clearance and fit for seal 8 to tip 7.

Additional relief taper cut 22 provides for improved installation and alignment of tip 7 as the tip moves along body shaft 17 toward seal 8 during installation during installation of the tip to the body shaft. Surface area 23 provides a pocket of free area so that tip 7 does not contact the top of seal 8, providing a gap that ensures that the top of seal 8 is not contacted, and thus the geometric "C" of the seal 8 is not deformed. The gap also provides for combustion gas to penetrate the gap between tip 7 and seal 8, so that it directly impacts the open end of the "C" forcing seal surface 40 (seen in FIG. 9) against tip 7 at radial surface area 24 and the body shaft at face 13 and face 14 (both seen in FIG. 4a), improving and insuring sealing properties.

Radial surface area 24 comprises an area where seal 8 mates and seals against the inside diameter of tip 7. This dimension is tightly controlled to insure proper fit, proper alignment, and the best possible sealing properties. This area has very stringent dimensional controls, i.e. a minimum of 32 RMS surface finish, and radial (not longitudinal) tool marks only. All of this is part of the seal design of the present invention. RMS is a method to measure surface finish on metal, as described in ASME 846.1. Ra is the arithmetic average of the absolute values of the profile height deviations from the mean line, recorded within the evaluation length, simply put it is the average of a set of individual measurements of surfaces peaks and valleys.

Additional designed taper 25 aligns tip 7 as it is initially disposed on seal 8 during installation. This design ensures that tip 7 does not negatively impact seal 8 as it is disposed. Taper design 25 ensures tip 7 is properly aligned with seal 8 and ensures the pressure of tip 7 against seal 8 is uniform and equal during installation, so that the "C" design or configuration of seal 8 compresses in a uniform and equal manner around the entire diameter during assembly.

Relief groove 26 is machined into tip 7 and additionally ensures proper installation as tip 7 is disposed adjacent to seal 8. Groove 26 provides a mechanism for tip 7 to move over seal 8 with an improved fit before the interference fit is encountered as tip 7 slides progressively down over seal 8 during assembly. Groove 26 also allows for smoother and easier installation of tip 7 onto body shaft 17, after it passes seal 8, on its path to the final seating face of seating surface 16 to body shaft 17.

Surface area 27's dimensions are tightly controlled to insure proper fit of tip 7 to body 9 as tip 7 is fitted to its final vertical location where seating surface 16 (see FIG. 4A) meets body shaft 17 (see FIG. 4A). This fit and location are critical to insure the proper location of tip 7, body 9 and seal 8 into the assembly.

Figure 6:
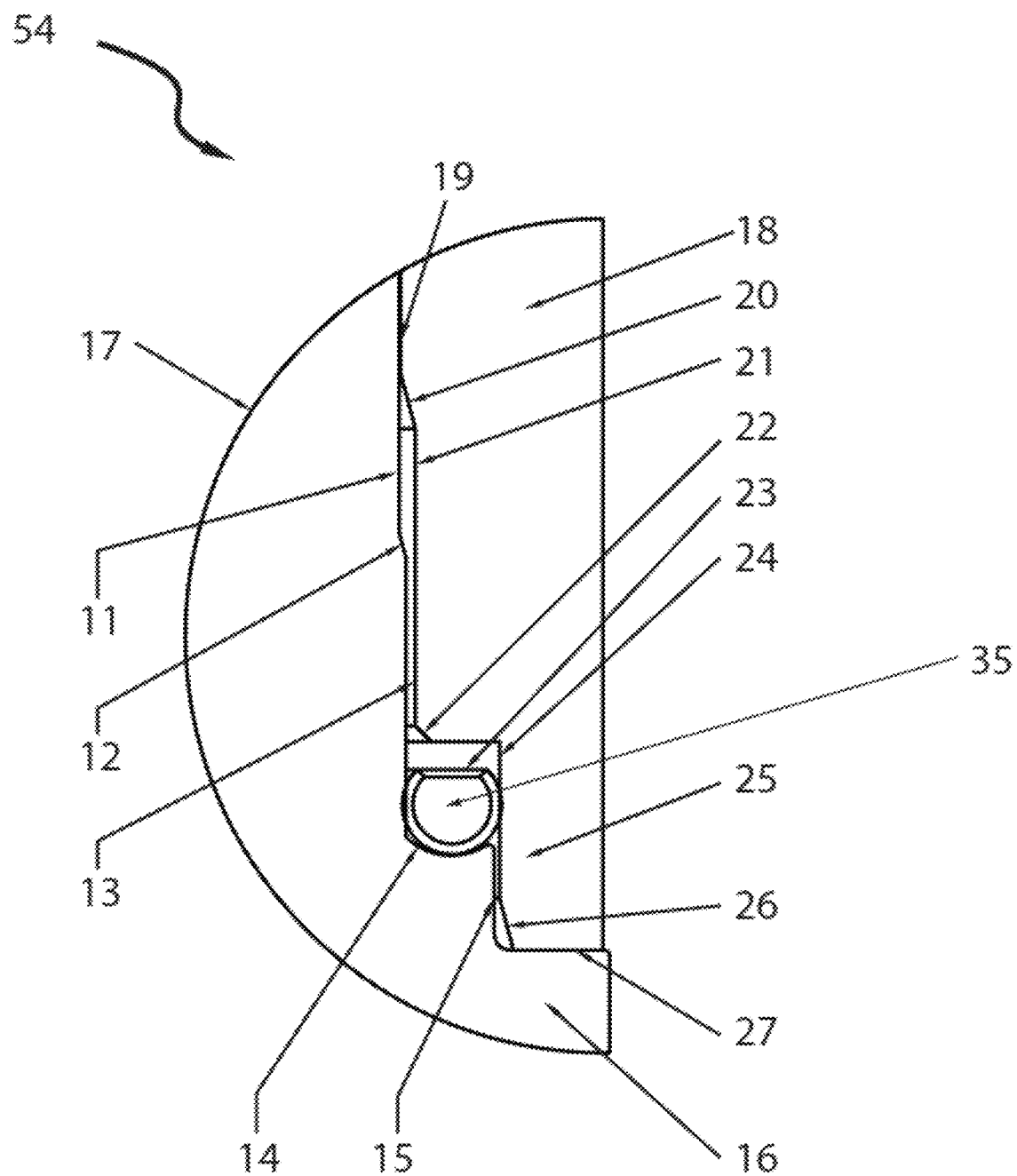
FIG. 6 is a cross section view of the seal assembly mechanism.

FIG. 6 is a cross section view of seal assembly mechanism 54 comprising tip 7, engineered metal seal 35, and body 9. This view shows the disposition of "C" engineered metal seal 35, not showing the internal energized wound spring. Sealing assembly mechanism 54 (also seen in FIG. 14) comprises tip 7, body 9, and seal 8 so that the elements work together as a system to provide a significantly improved seal that is improved over seals currently used. FIG. 6 includes elements previously described and illustrated in other figures, such as body shaft 17, the diameter of body shaft 11, taper area 12, surface of body shaft 13, face 14, area 15, seating surface 16, etc. seen in FIGS. 4A and 5.

Figure 7:
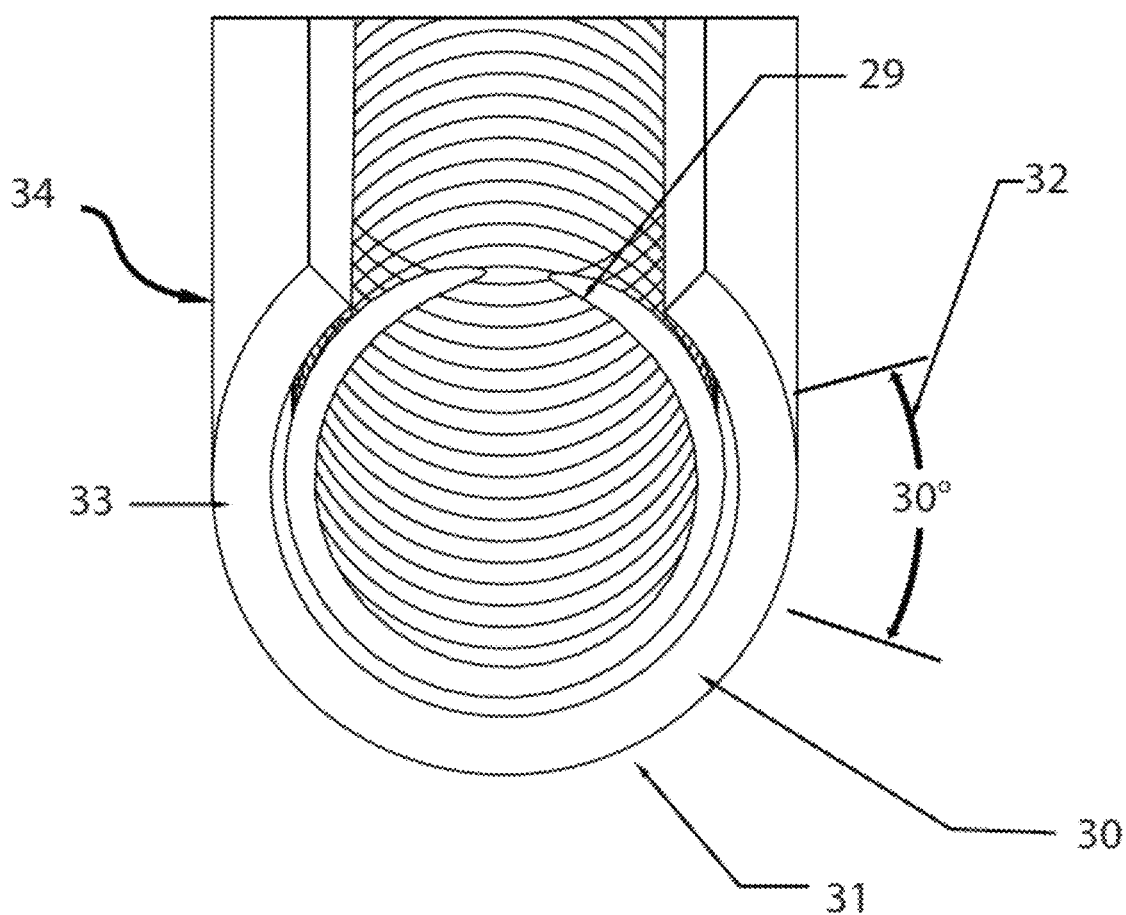
FIG. 7 illustrates a cross section view of the spring energized metal seal of the present invention.

FIG. 7 illustrates a cross section view of the spring energized metal seal of the present invention. This is a cross section view of spring energized engineered metal seal 34 disposed with internal wound energized spring 29. This version of engineered metal seal 34 is comprised of the "C" engineered metal seal assembly mechanism 44 shown in FIG. 11, with added internal wound spring 29 that is disposed in the "C" section of engineered metal seal 44, thus comprising spring energized engineered metal seal 34.

Wound spring 29 is disposed in the "C" section of the engineered metal seal. Spring 29 maintains outward force against the sides of the "C" section of the seal. This spring force works to maintain constant force of the seal to the mating surfaces of both body shaft 17 and the tip sealing surface. The winding of the spring has openings so that combustion gas can pass through it allowing the combustion gas to also provide additional outward pressure, forcing the seal against the mating surfaces.

"C" engineered metal seal 30 acts as the casing for sound spring 29. Outside radius 31 of "C" engineered metal seal 30 also comprises the radius area that is specified and designed to mate to groove 14 (shown in FIG. 4A) that is cut into the face of body shaft 17. This outside radius design allows for more surface contact area where engineered metal seal 8 meets body shaft 17 face sealing area at groove 14. This design promotes greater seal surface area and thus greater combustion pressure forces against seal 8 and to the body shaft at groove 14 during combustion, due to the forces of combustion gas pressures against the seal. Area 32 is where the seal contacts and seals against tip 7 on its inside diameter 24. Within the same 30 degree specified area of surface 33 is where engineered metal seal 8 contacts and seals against body shaft 17 at face 13.

Figure 8:
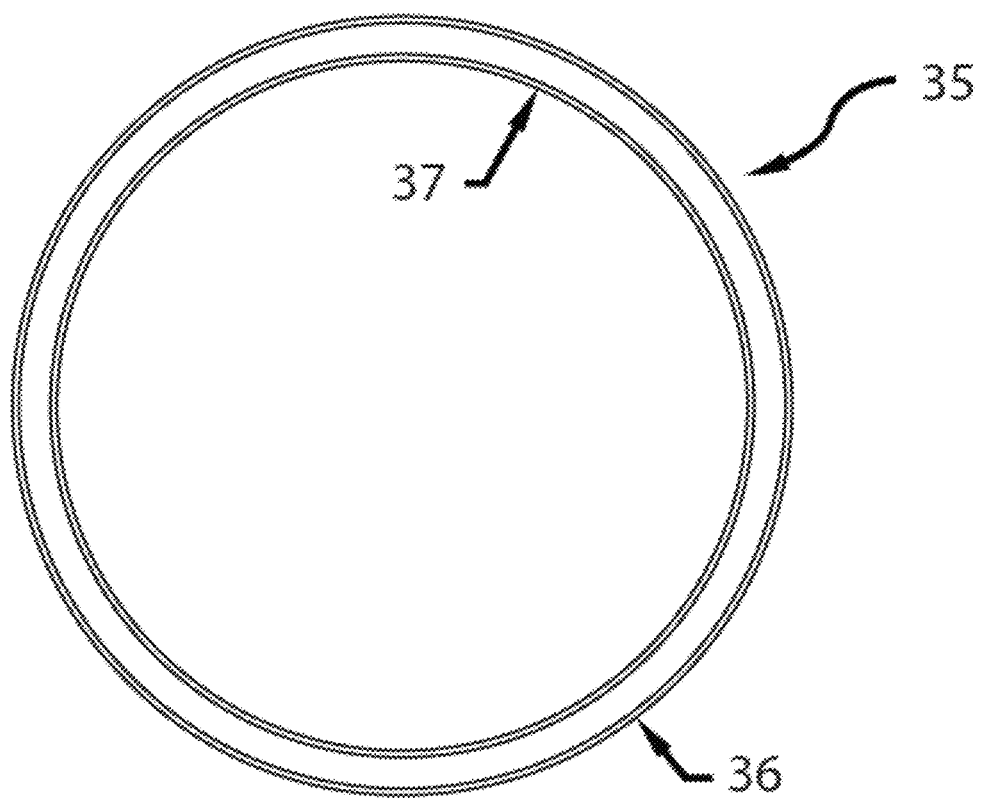
FIG. 8 is a top view of a metal seal.

FIG. 8 is a top view of a metal seal. FIG. 8 illustrates a top view of "C" engineered metal seal 35 without an energized spring. Outside diameter surface 36 of engineered metal seal 35 contacts the sealing surface of the tip. Inside diameter 37 of engineered metal seal 35 contacts the body shaft 17 at face 13.

Figure 9:
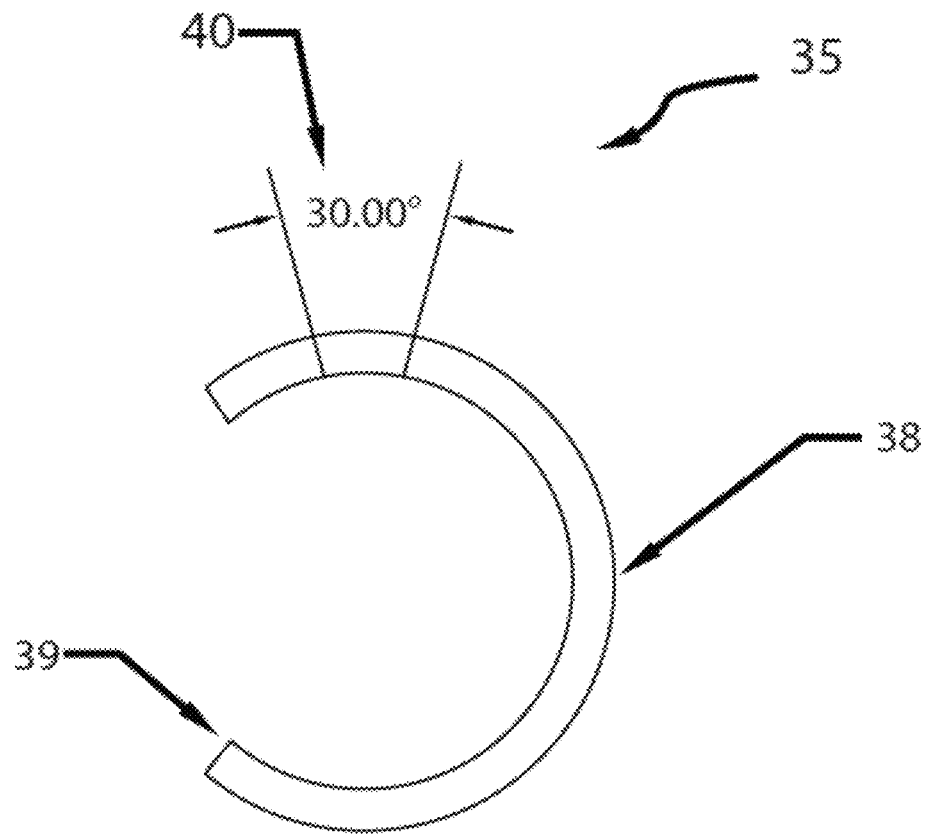
FIG. 9 is a cross section view of a "C" engineered metal seal.

FIG. 9 is a cross section view of "C" engineered metal seal 35, without the energized internal spring comprising designed outside diameter surface 38 and the geometry of the "C" seal. The perimeter of this outside diameter surface is the sealing contact area against body shaft 17 and tip 7. This design allows for many design benefits, including but not limited to allowing seal 35 to flex like a spring under load. The design provides for increased sealing surface area because by the design more surface contact area is created. The "C" shape and spring temper provide for combustion gasses to force the seal against the mating parts with increased pressure which provides an increased seal due to the combustion loads applied.

Designed inside diameter surface 39 of the "C" seal provides the maximum spring benefit against the sealing surfaces. When the energized wound spring is added to the design, this is where it is installed. Designed contact area 40 provides for mating of engineered metal seal 35 to tip 7, and opposite this area on the other side of the "C" is where engineered metal seal 35 mates to body shaft 17.

Figure 10:
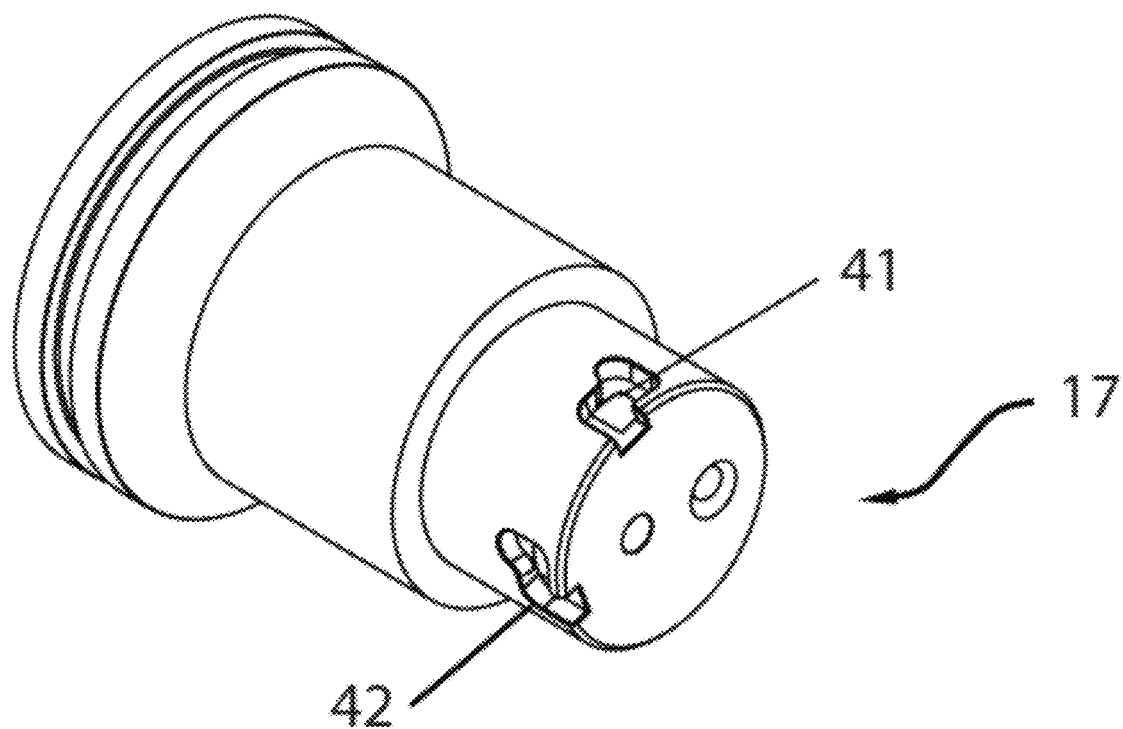
FIG. 10 illustrates the body shaft element of the pre-combustion chamber assembly of the present invention.

FIG. 10 illustrates body shaft 17 of the pre-combustion chamber assembly of the present invention. This view shows the re-location of the groove in the body shaft that is used to properly orient the tip. This modification is an improvement that is necessary to accommodate face type engineered metal seal 47 (shown in FIG. 14) due to an interference problem created when machining the required sealing surfaces into the original of the alternate embodiment of the pre-combustion chamber assembly. Without this design modification, face type engineered metal seal 47 cannot be used on the pre-combustion chamber. New location 41 of the groove and former location 42 of the groove are shown in this figure.

FIG. 11 is a cross section view of the seal assembly of the present invention. FIG. 11 illustrates a cross section view of seal assembly mechanism 44 comprising internal wound energized spring seal 34, area 18 (shown in FIG. 48 and FIG. 5), and shaft body 17. The other elements are shown in other Figures herein.

Figure 12:
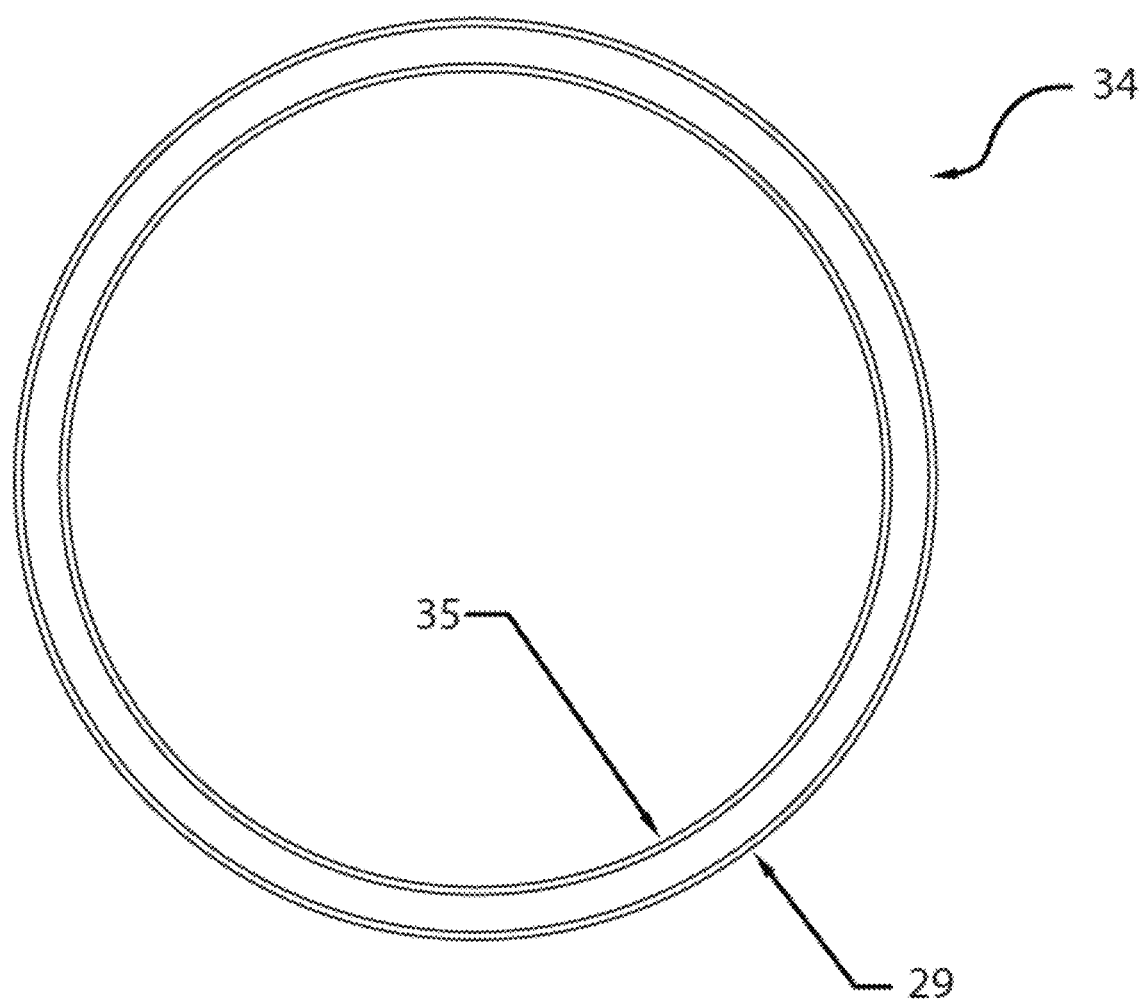
FIG. 12 is a top view of an energized metal seal.

FIG. 12 is a top view of "C" energized metal seal 34 comprising "C" type engineered metal seal 35 and internal wound energized spring 29.

Figure 13:
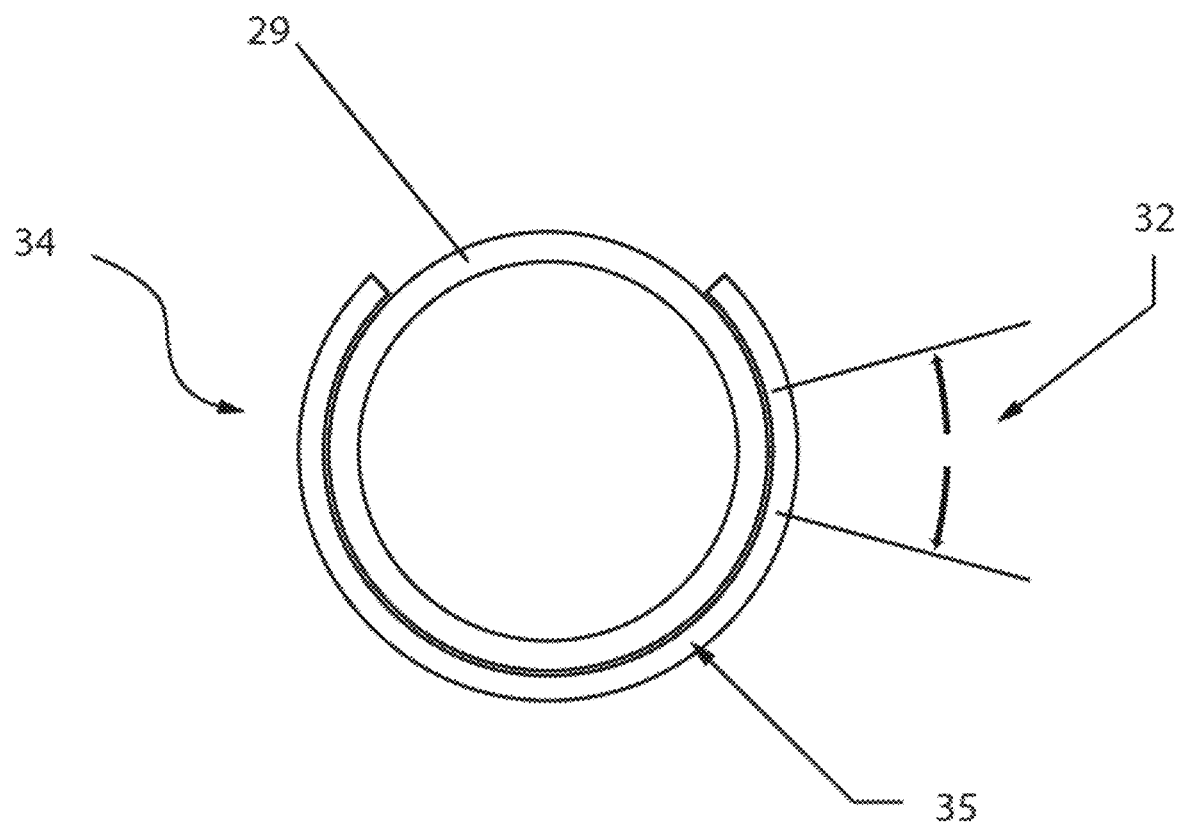
FIG. 13 is a cross section view the energized metal seal illustrated in FIG. 12.

FIG. 13 is a cross section view of the energized metal seal illustrated in FIG. 12. FIG. 13 illustrates a cross section view of "C" type engineered metal seal 35 comprising an internal wound energized spring, seal contact area 32 disposed between the engineered metal seal and the tip, "C" engineered metal seal 35 and wound energized spring 29.

Figure 14:
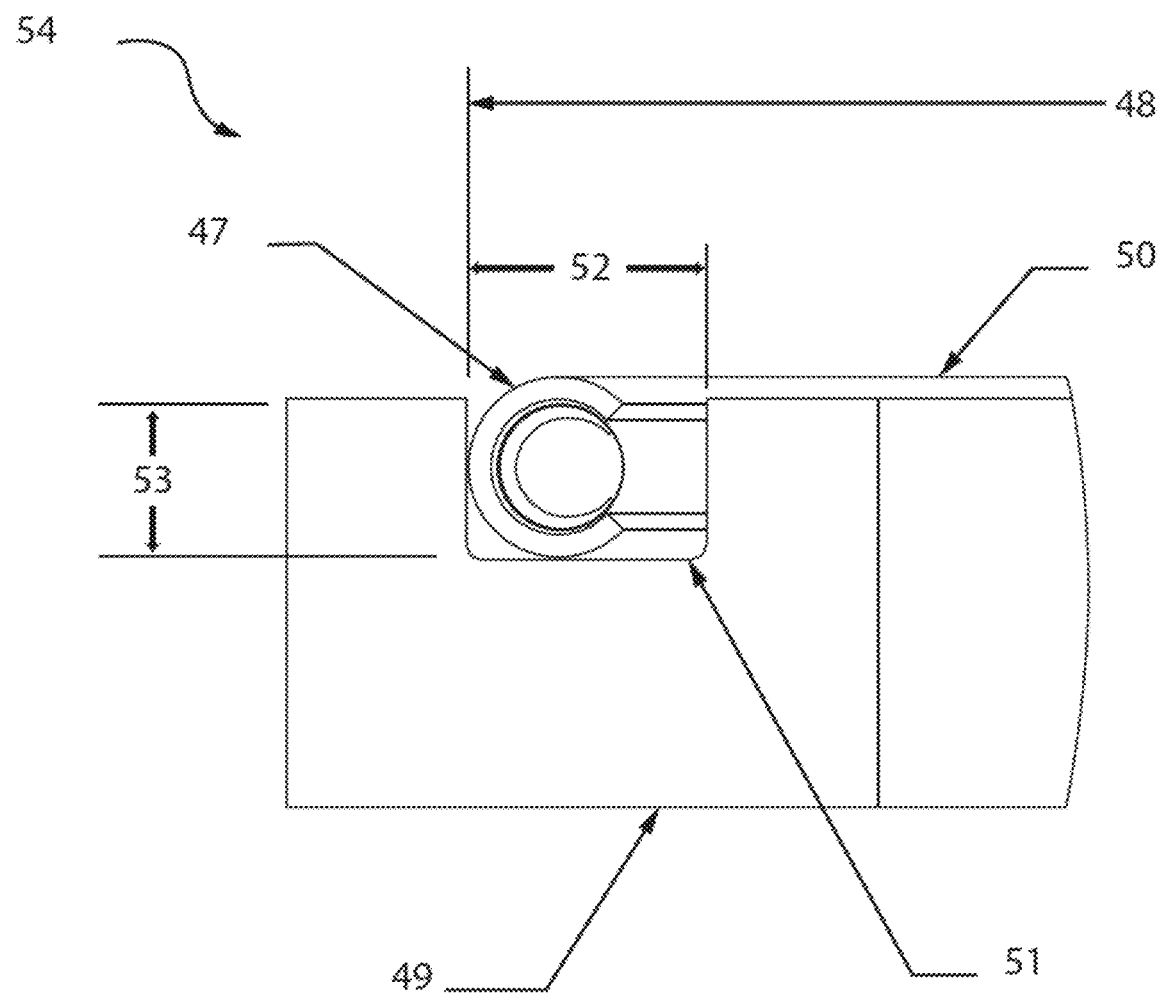
FIG. 14 is a cross section view of the assembly seal mechanism of the present invention.

FIG. 14 illustrates a cross section view of the assembly seal mechanism 54 comprising spring energized engineered metal face seal 47. Element 49 is a cross section view of the shaft body where the groove 52 to 53 is machined into the face of body shaft 17. Location 50 is the area of compression that is generated when the tip is compressed against the shaft body during installation. Location 52 is the width specification of the groove that contains face type engineered metal seal 47. Location 53 is the depth specification of the groove disposed in body shaft 17 that contains face type engineered metal seal 47.

The method of use of the alternate embodiment of the present invention comprising plated C-ring shaft seal comprising a close-wound helical spring core results in providing increased working pressure greater than 20,000 psi. Plating provides a ductile outer layer to fill surface imperfections for a better seal and more economical manufacturing cost. Plated C-ring shaft seal also provides an improved base material with an internal spring and continuous positive pressure providing improved seating force and improved elasticity to accommodate joint movement. Plated C-ring shaft seal comprises spring coils that work independently of one another, compensating for any slight deviations in surface flatness.

Using a seal that seals on the shaft, i.e. the outside diameter of the chamber body, and/or the inside diameter of the tip reduces the forces, pressure and cyclic loading on the seal. During combustion the forces created are in alignment with the shaft and parallel to the tip and body, so these forces are not absorbed by the seal, and thus the seal is less susceptible to deformation, and the life and performance of the seal is increased. Thermal cycling and cyclic loading from combustion are carried by mating parts, not the seal itself because the present invention provides for adding a groove for the seal to be disposed, thus limiting deflection. The seal of the present invention provides for a lower leak rate than other types of seals currently in use.

Sealing the tip to body on the inside diameter of the tip to the outside diameter of the body in both embodiments of the present invention provides for an improvement to seals currently used. Previous designs used only a seal on the face of the two parts or a seal on both the face and the diameter together.

The tip is modified with a shoulder on its outer diameter and a step on the inner diameter for an improved slip fit onto the chamber body. Specifications for the slip fit are driven by several factors.

Thermal expansion between the tip and body materials is considered. Another consideration is the dead volume contained in the clearance between the parts. Crevice volumes in the combustion chamber are known to be a major source of unburned hydrocarbon emissions. If the clearance between the tip and body is sufficiently large, the flame will be able to propagate through the dead volume, and minimal contribution to unburned hydrocarbons would be expected. As the gap is decreased, there will be a point at which the flame quenches at the crevice entrance. This gap corresponds to a maximum contribution to hydrocarbon emissions. The present invention's improved configuration and dimensions result in gaps smaller than this threshold, resulting in a lower contribution to hydrocarbon emissions due to the reduction in dead volume.

The chamber body is modified by elongating the sealing face by adding axial length. The tip is modified by adding a counterbore to accept the spring energized C-ring seal. A shoulder is added to the outer diameter of the tip.

Use of a small gap rather than one large enough for flame propagation ensures consistent positioning of the tip on the body and results in lower temperature demands on the seal while minimizing the dead volume available for generation of unburned hydrocarbon emissions. The seal of the present invention is less susceptible to cyclic loading than a washer since the seal is contained within a groove, as long as deflection of the groove is kept to a minimum. The design of the present invention results in minimal deflection of the groove due to combustion chamber pressure. The present invention seal configuration is also strong enough to perform with the expected clamping load and cyclic combustion chamber pressure force.

Combining a high temperature material like Inconel 718 with an energized seal, where the seal is also copper plated, and using a high temperature material in the ignition pre-chamber, in the groove, and with improved geometry and tolerances creates an improved apparatus and method of sealing the parts of the apparatus of the present invention.

Material compatibility and durability issues related to cyclic temperature and pressure changes were considered. In addition to the material for the seals themselves, the materials used for the tip, chamber, and check valve were also reviewed.

Example 1: C-Ring Seal Materials

Since current gasket type seals lose their hardness and deform due to thermal and cyclic loading, the C-ring type seals used here were not as susceptible to loss of hardness due to the thermal and cyclic loading of the parts during combustion cycling.

The C-ring seals of the present invention used Inconel, titanium and or other high temperature tolerant materials that provided better strength and wear characteristics at high service temperatures. Inconel 718, Inconel 754, Inconel 625, and Ti-15Mo-3Al-3Nb provided a higher service temperature, improved wear characteristics at high service temperatures, a higher toughness at all temperature ranges, and higher temperature tolerance than the current seal materials being used.

Example 2: Stress Analysis

Stress analysis results indicated that the seal configuration of the present invention is strong enough to perform with the clamping load and cyclic combustion chamber pressure force expected. Using the tip dimensions of 1.86" outer diameter and 1.47" inner diameter, this corresponds to around 25.5 ksi (kilograms/square inch) stress which must be carried by the seal material. Similarly, for the tip to combustion chamber seal, using 1.85" inner diameter and 2.125" outer diameter, the seal must carry around 30.3 ksi. The magnitude of cyclic loading on the pre-ignition chamber to tip seal due to engine cylinder pressure was estimated assuming a 1,500 prig (pounds/square inch gage) peak cylinder pressure acting equally on all exposed faces within the tip, up to the sealing washer and check valve. The main effect was determined to be that the load carried through the seal is reduced as the pressure force acts on the face of the chamber body.

Based on the 1.47" ID of the tip, 1,500 psi amounts to around 2,500 lbf (pounds force) of fluctuation. With the bolt clamp load putting the seal near the yield strength of copper-nickel alloys, plastic deformation of the seal under this cyclic loading is not surprising. Obtaining a good seal requires that imperfections in surface finish and flatness are filled by the seal material. For this reason, a material with low elastic modulus but high yield strength was determined to be suitable for the present invention. Given the cyclic loading seen by these seals, a yield strength of at least 40 ksi was determined to be required.

Example 3: Gasket Materials

Figure 15:
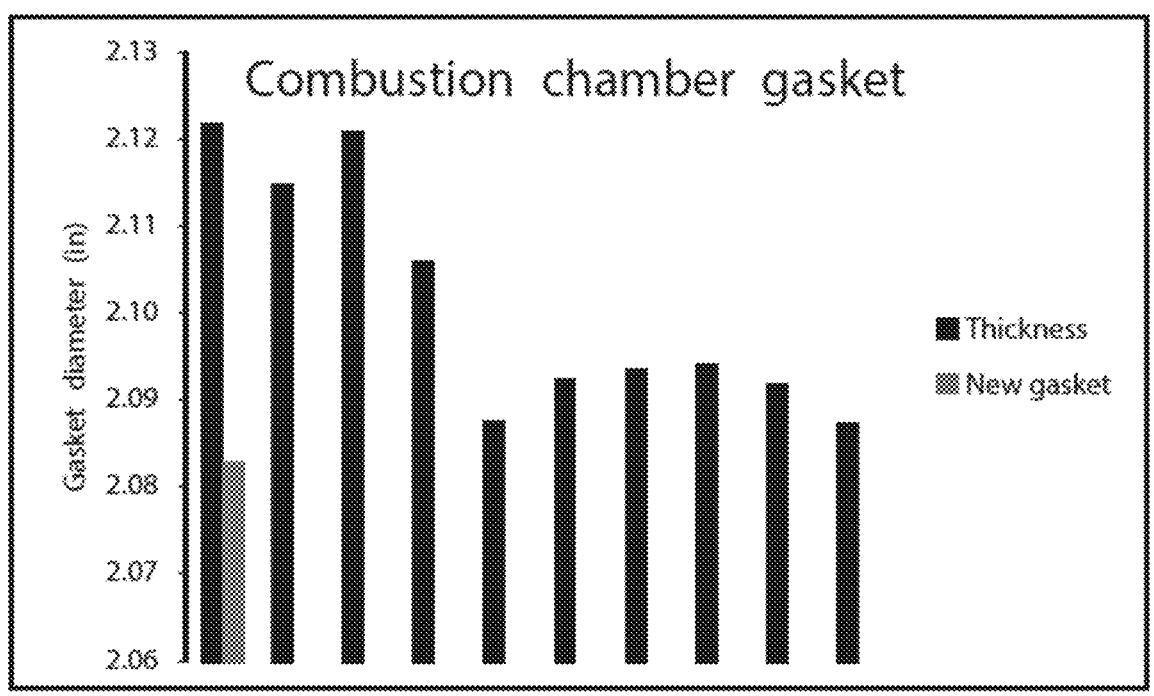
FIG. 15 is a graph illustrating the plastic deformation of the thickness of the combustion chamber gasket of the present invention.
Figure 16:
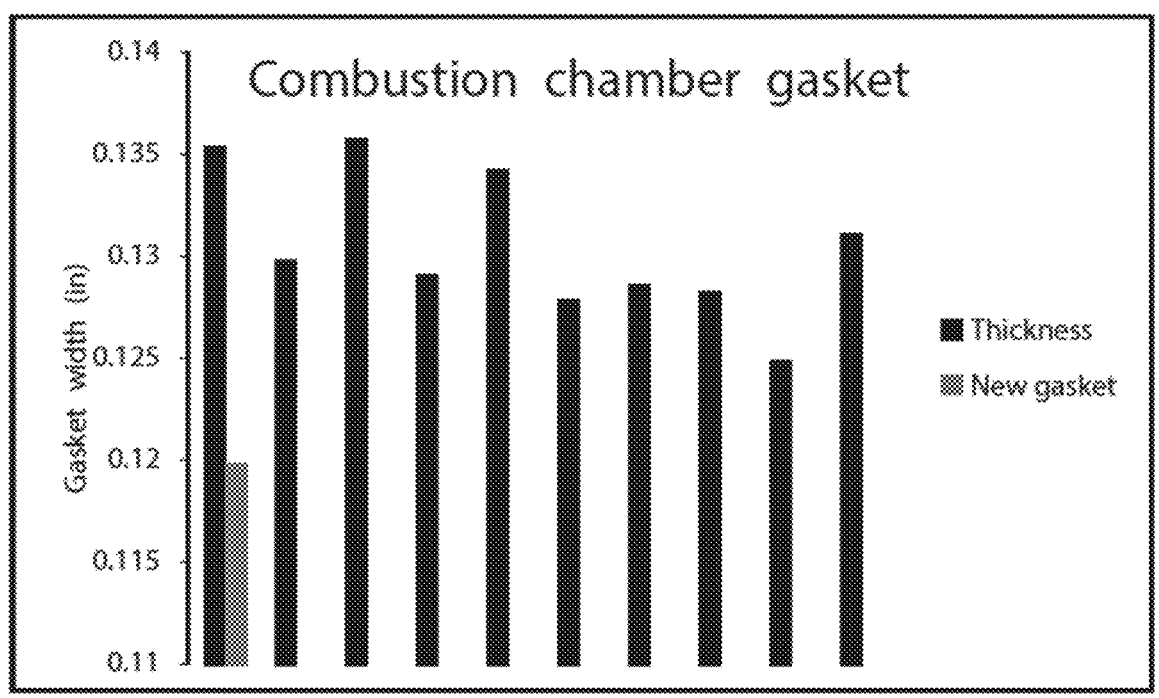
FIG. 16 is a graph illustrating the plastic deformation of the thickness of the combustion chamber gasket of the present invention.
Figure 17:
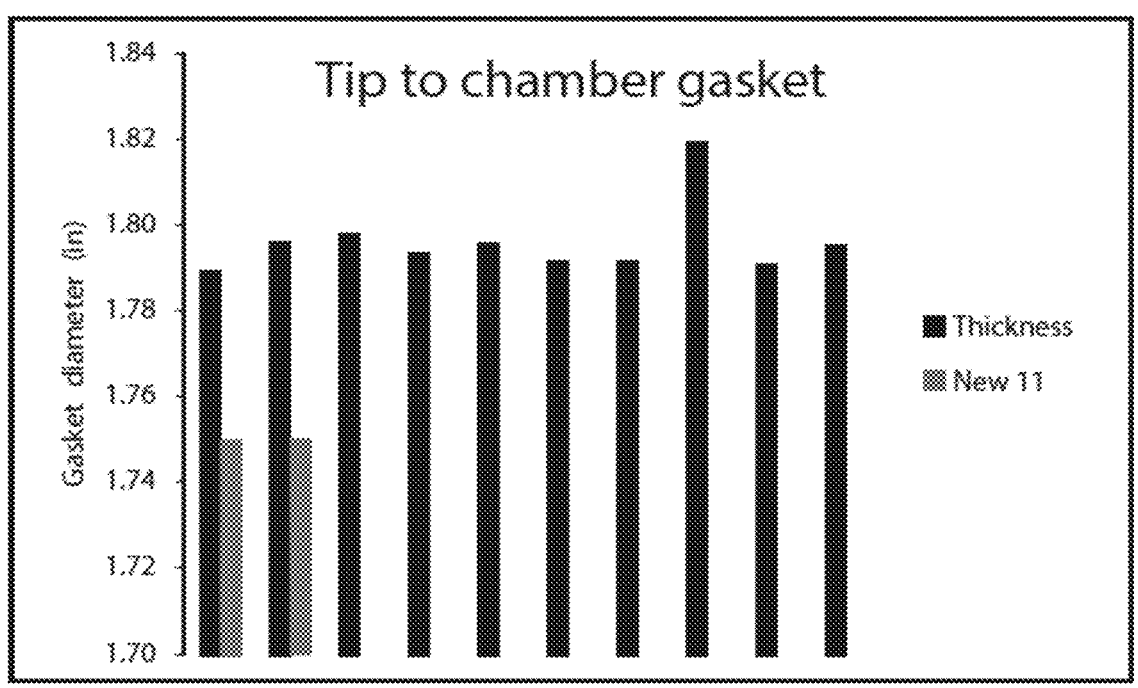
FIG. 17 is a graph illustrating the plastic deformation of the tip to combustion chamber gasket of the present invention.

Dimensions of used and new gaskets were measured with a micrometer to measure whether plastic deformation was occurring during service. FIG. 15 is a graph illustrating the plastic deformation of the thickness of the combustion chamber gasket of the present invention. FIG. 16 is a graph illustrating the plastic deformation of the thickness of the combustion chamber gasket of the present invention. These Figures illustrate gasket dimension measurements completed in this study. In addition to the data plotted in FIGS. 15 and 16, the width and diameter of currently used gaskets were both found to increase during service, indicating that the gasket is essentially forged to a thinner, wider shape during service.

Additionally, the approximate hardness of the tip to chamber used gaskets were determined to be 89 Vickers, while the new tip to chamber gaskets were found to be 115 Vickers. This indicates that the moderately high (~400° F.) exposure temperatures were lowering the strength of the currently used copper-nickel (Cu—Ni) gaskets.

Although plastically deforming gaskets by crushing can be a method used to get them to seal properly, in an environment subjected to vibration or cyclic loading, elastic deformation which can accommodate the dynamic strains is preferable. To this end, materials with a higher strength and lower modulus than the current 70/30 Cu Ni mix are desirable. The experiments described herein have led to preferable seal materials.

Granta's CES Selector software using the Material Universe database was used to provide the data and plots for the following materials selection exercises.

Materials were filtered by those which had a maximum service temperature above 400° F., the expected temperature at the gasket position, and a cost less than $15.00/lb.

Figure 18:
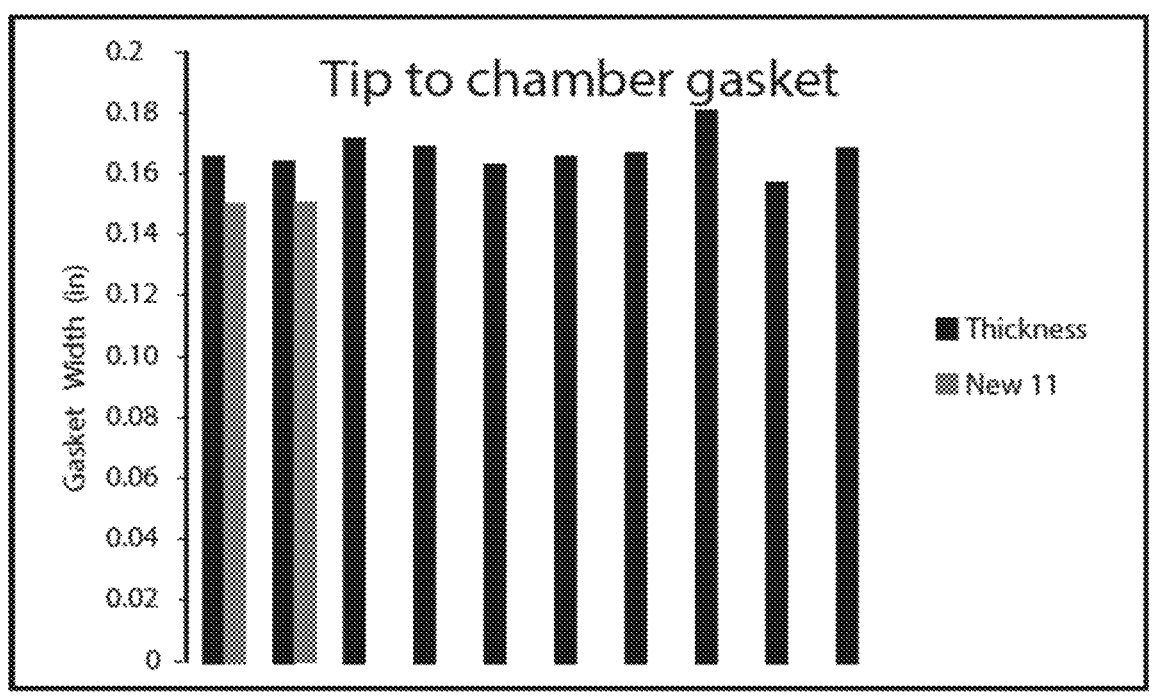
FIG. 18 is a graph illustrating the plastic deformation of the tip to combustion chamber gasket of the present invention.
Figure 19:
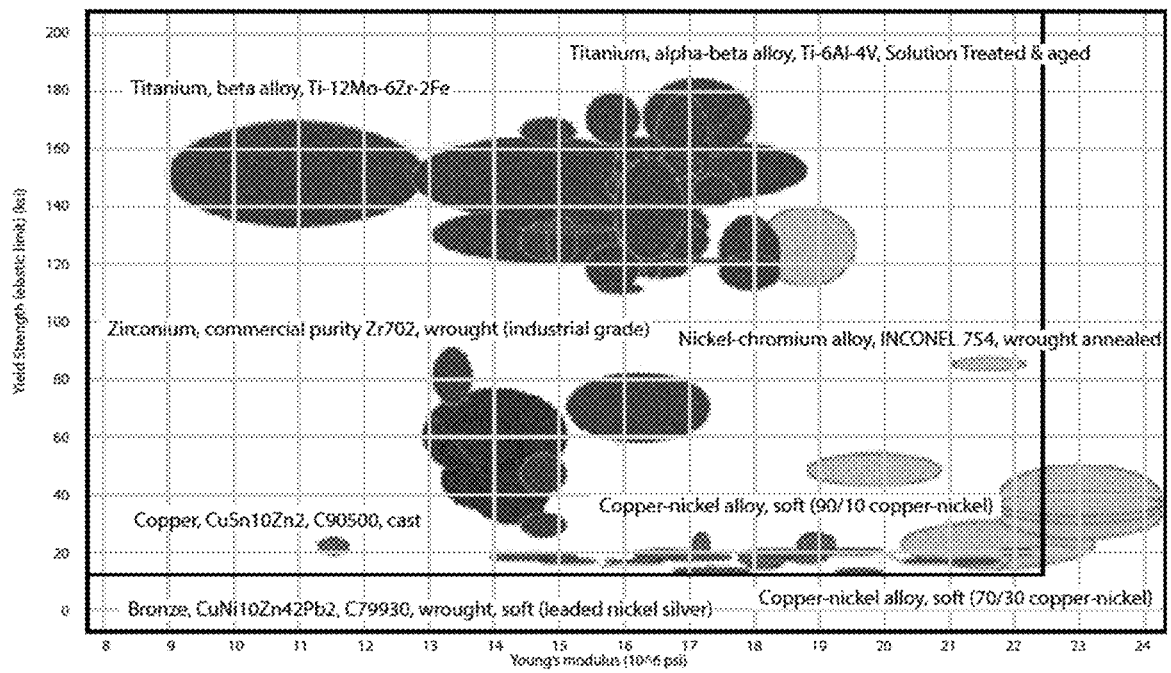
FIG. 19 illustrates an Ashby plot, plotting yield strength vs. Young's modulus.

FIG. 19 illustrates an Ashby plot, plotting yield strength vs. Young's modulus that was generated showing potential replacement materials for the tip to chamber seal. Desired properties of the seal are higher strength and lower modulus. This plot includes materials with a maximum service temperature greater than 400° F. FIG. 18 illustrates that among these types of materials, 70/30 copper-nickel has quite a high modulus and low strength. Its strength is merely half of the 40 ksi recommended due to stress analysis experiments reported in Example 1. The various alloys are colored according to their major constituents. All of the copper alloys are too weak. INVAR and thoria dispersed Ni are strong enough, although their modulus remains rather high. The best options are Titanium alloys, which have lower moduli and high strength.

A similar analysis was performed on the combustion chamber gasket, currently made from Monel 404. The width has increased in the used gaskets as shown in FIG. 15. The initial approximate hardness of the Monel gasket was 177 Vickers, while the used gaskets averaged around 140 Vickers hardness. The upper gasket experiences much higher temperatures than the tip to chamber gasket, in excess of 1100° F.

Figure 20:
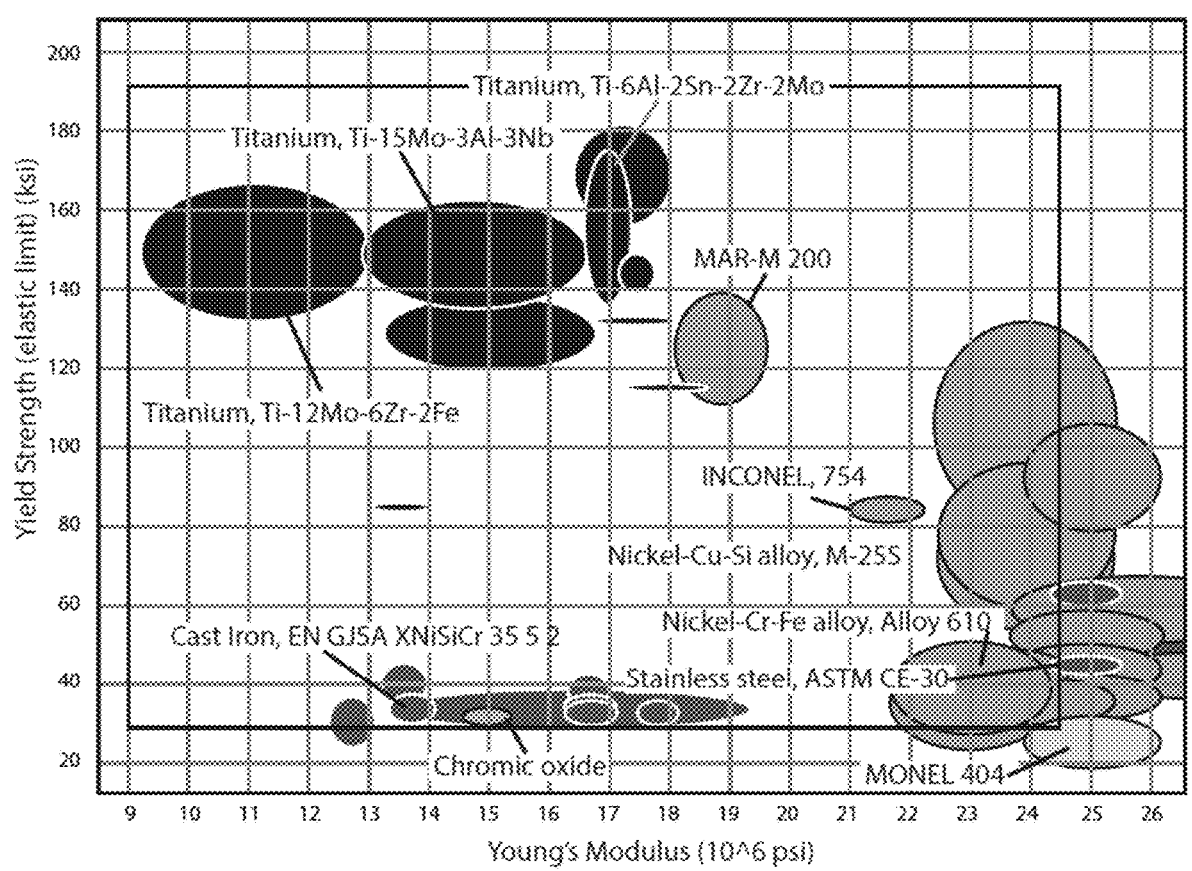
FIG. 20 illustrates an Ashby plot of modulus vs. yield strength for the combustion chamber gasket replacement material.

A similar materials selection exercise was done for the combustion chamber seal, but with the minimum temperature of this portion of the apparatus set at 1100° F. and cost set below $40/lb, it was determined that Ni alloys, Ti alloys, and Fe alloys, as well as a couple of ceramics which would be too brittle for the application would work well. Materials with fracture toughness lower than 50 ksi/square inch were removed from the Ashby plot shown in FIG. 20. FIG. 20 illustrates an Ashby plot of modulus vs. yield strength for the combustion chamber gasket replacement material.

Figure 21:
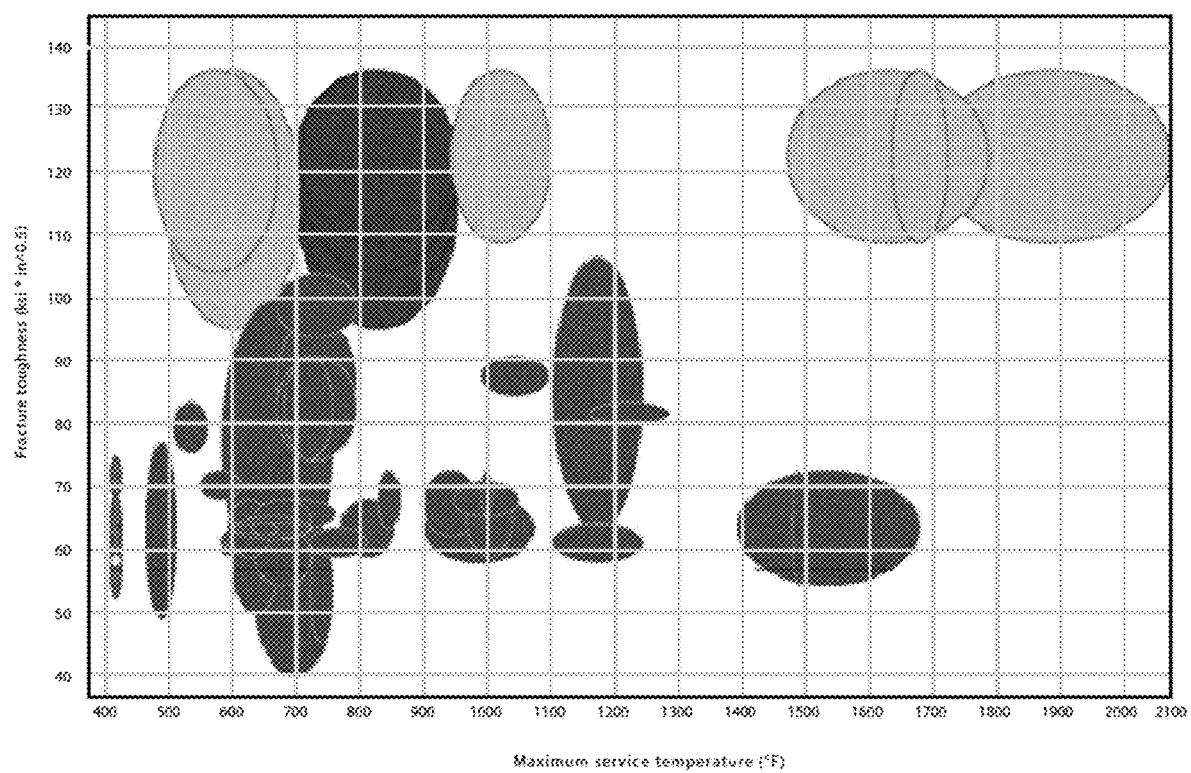
FIG. 21 illustrates an Ashby plot of fracture toughness vs. maximum service temperature.

FIG. 21 illustrates an Ashby plot of fracture toughness vs. maximum service temperature illustrating that preferred materials have similar or higher toughness and higher temperature tolerance than currently used materials.

Figure 22:
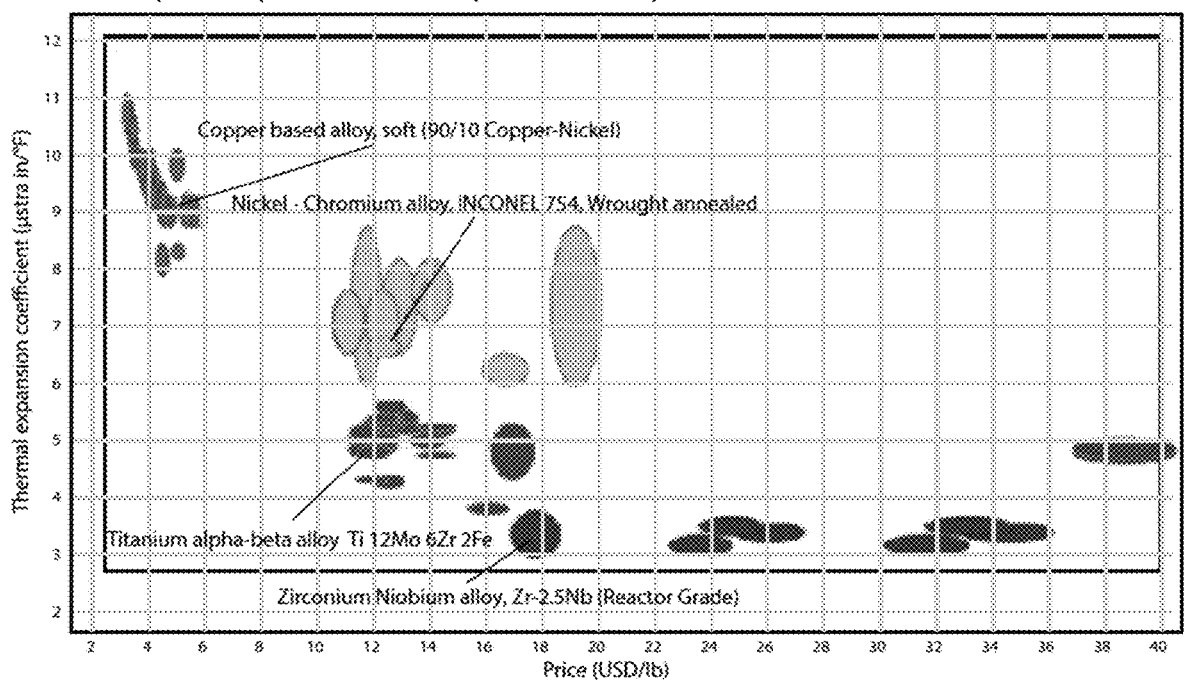
FIG. 22 illustrates an Ashby plot of thermal expansion coefficient vs. price.

FIG. 22 illustrates an Ashby plot of thermal expansion coefficient vs. price of materials. Desired properties are low modulus, high strength, and low cost. Nickel and titanium alloys exhibit the preferred quality of lower thermal expansion coefficient than currently used copper gaskets.

The present invention provides for an improved seal design for the tip to chamber body seal comprising a plurality of spring energized metal C-rings. The C-ring consists of a plated 'C' shaped metal jacket over a close-wound helical spring coil core. The spring and jacket are made of a high temperature, high strength alloy such as Inconel Alloy 625, Alloy 718, or Alloy X750, and the jacket is plated with a soft material such as silver or copper. The plating provides a ductile outer layer to fill surface imperfections and the jacket material, internal spring, and gas pressure force provide a high seating force with good elasticity.

The spring coils work independently of one another so slight deviations in surface flatness are tolerated. The seals are installed with a deflection-limiting feature configured similar to an O-ring groove, resulting in loading beyond the seating load of the seal being carried by the mating parts, and not the seal itself.

The placement and design of pre-combustion chambers currently used in engines are susceptible to impact forces that are created when combustion occurs inside the piston. This combustion explosion causes forces to be transmitted back against the pre-combustion chamber and results in significant impact to the seal and mating seal surfaces currently used. This results in deformation of the seal and or seal surfaces, leading to loss of compression at the seal surface, and leaks. Both embodiments of the present invention overcome these deficiencies.

In conclusion, there are thus four mechanisms that provide direct pressure of the seal of the present invention to the mating surfaces, i.e. (a) the interference fit, (b) the spring action of the "C" geometry, (c) the spring temper of the heat treat applied to the "C" geometry, (d) the internal wound spring pushing out and up against the "C" seal, and (e) the combustion pressure that feeds into the top opening of the "C", which pushes the interior of the C geometry out and against the mating surfaces.

Other considerations comprise the use of new materials including but not limited to Haynes 242 per AMS 5951 and Rene 41 to the list of seal materials. Optional copper plating, optional silver plating, and/or optional gold plating add to sealing properties because of the use of soft metals, adding to corrosion resistance. Use new internal spring materials comprising Inconel materials including Hastelloy C-276 per UNS N10276. Add new design of the face of engineered metal seals of all geometries and both with and without energized springs, as well as the design of the radial shaft sealing style and using engineered metal seals of all geometries both with and without energized springs.

Figure 23:
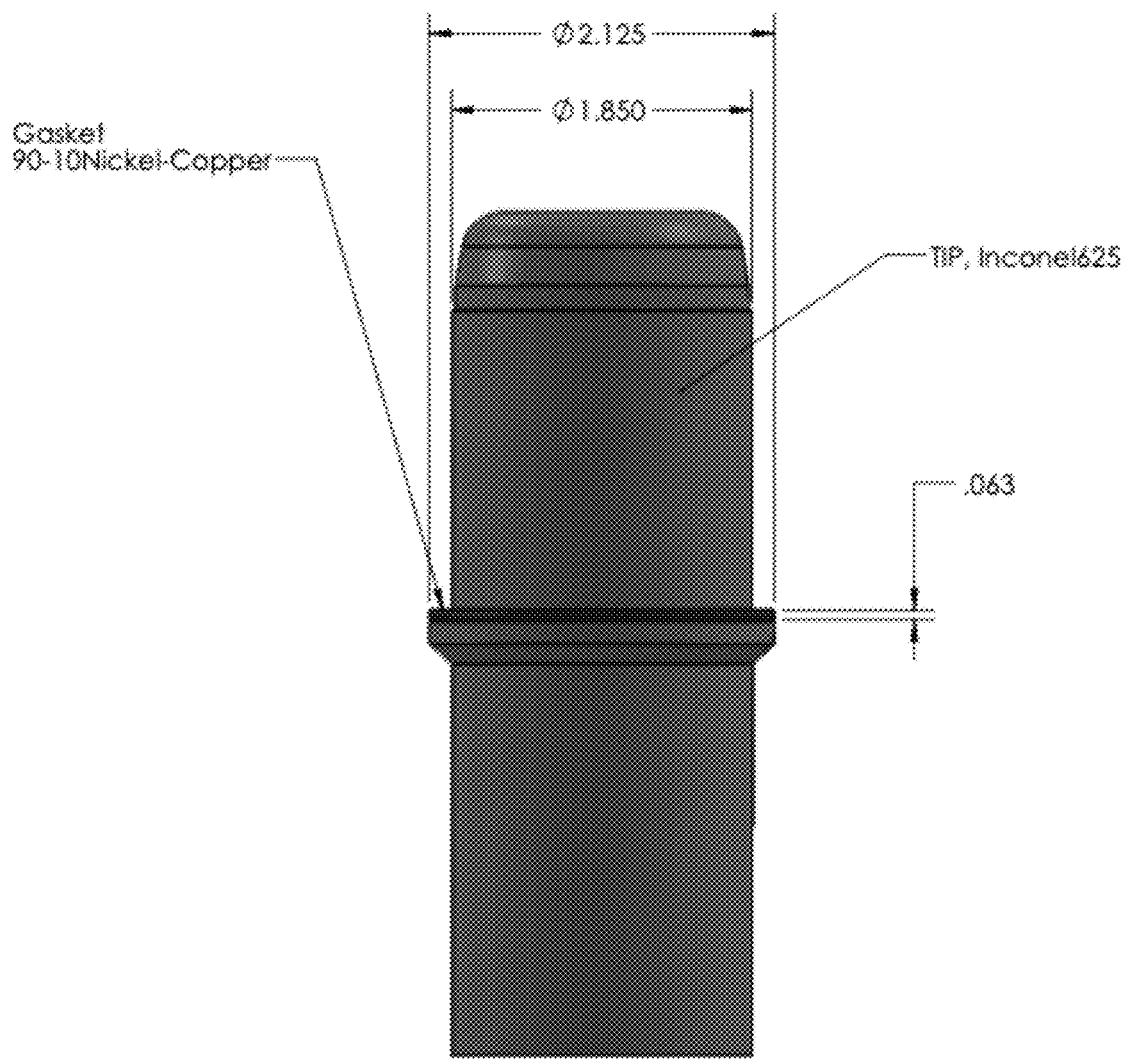
FIG. 23 is an illustration of a precombustion chamber assembly, showing representative dimensions and materials.

FIG. 23 is an illustration of a precombustion chamber assembly, showing representative dimensions and materials. The precombustion chamber assembly comprises a body (the lower portion in the figure) with a tip (the upper portion) that mounts over the body, as discussed in more detail above.

The precombustion chamber assembly has a portion with an increased diameter, that provides a shelf or sealing surface that facilitates sealing of the entire precombustion chamber assembly to the engine when mounted in an engine.

Figure 24:
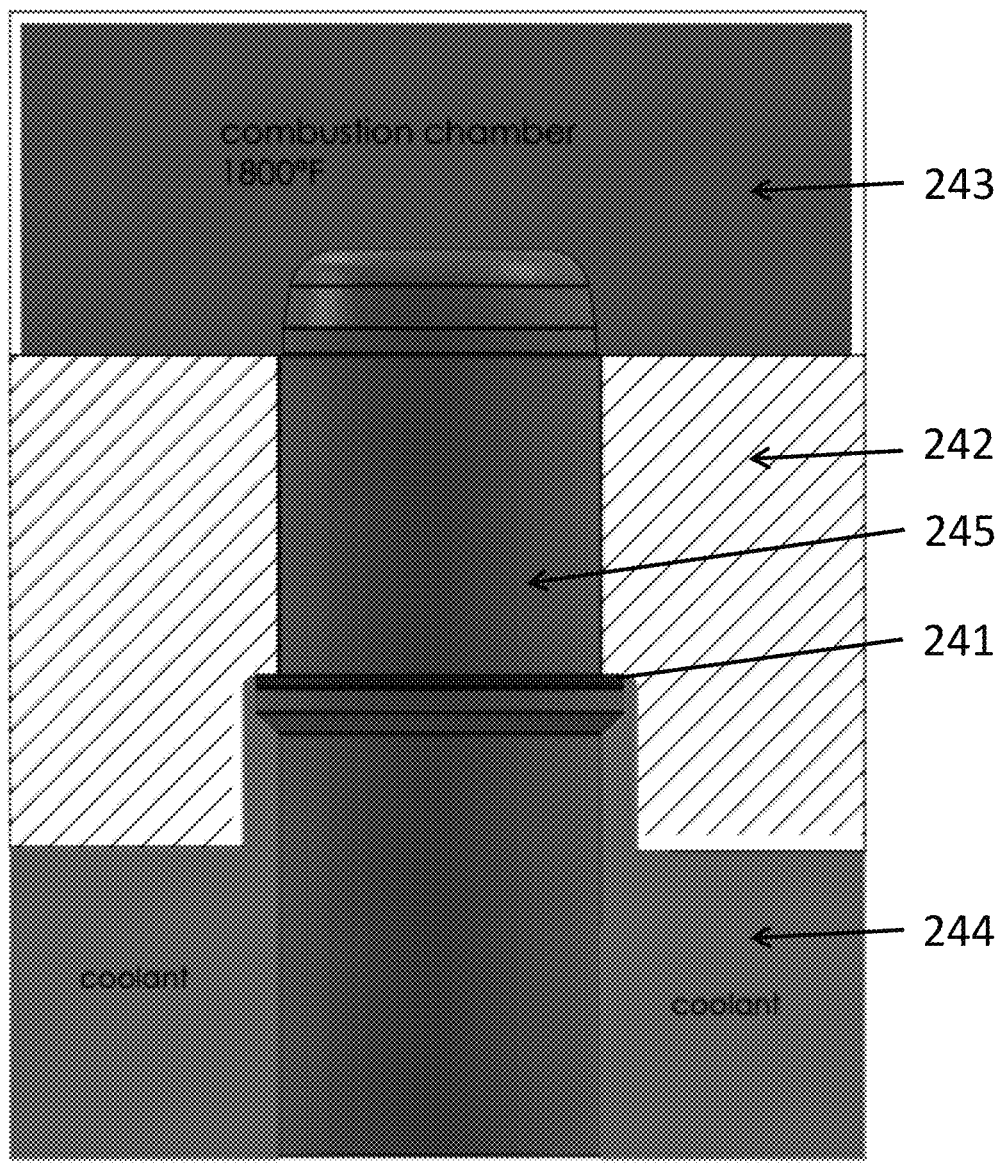
FIG. 24 is an illustration of a precombustion chamber assembly mounted in an engine, showing relative positions of a combustion chamber, the tip and coolant source.

FIG. 24 is an illustration of a precombustion chamber assembly mounted in an engine 242, showing relative positions of a combustion chamber 243, the precombustion chamber assembly 245 and coolant source 244. The precombustion chamber assembly 245 extends through a portion of the engine, typically an engine head 242, the precombustion chamber assembly 245 is secured to the head 242, typically with two bolts not shown in FIG. 24 but illustrated in FIG. 1. The bolts force the precombustion chamber assembly 245 against the head 242, compressing a gasket 241 between the sealing surface and the head. The conventional gasket is a solid 1018 steel flat washer style gasket. These gaskets only last approximately 7,000 hours of use. They start to pit and erode due to high operating temperatures and they are exposed to engine coolant that depending on the mix can be corrosive. In addition if the engine is not correctly grounded then electrolysis can occur on the gasket, accelerating its deterioration. The prechamber assembly is typically held against the gasket by two bolts. As the force of combustion hits the tip end of the prechamber assembly the bolts are stretched and over time they can and do lose torque. When this happens the gasket/seal starts to leak. Conventional flat metal washer gaskets are also very dependent on surface finish of mating surfaces to create a quality seal.

Figure 25:
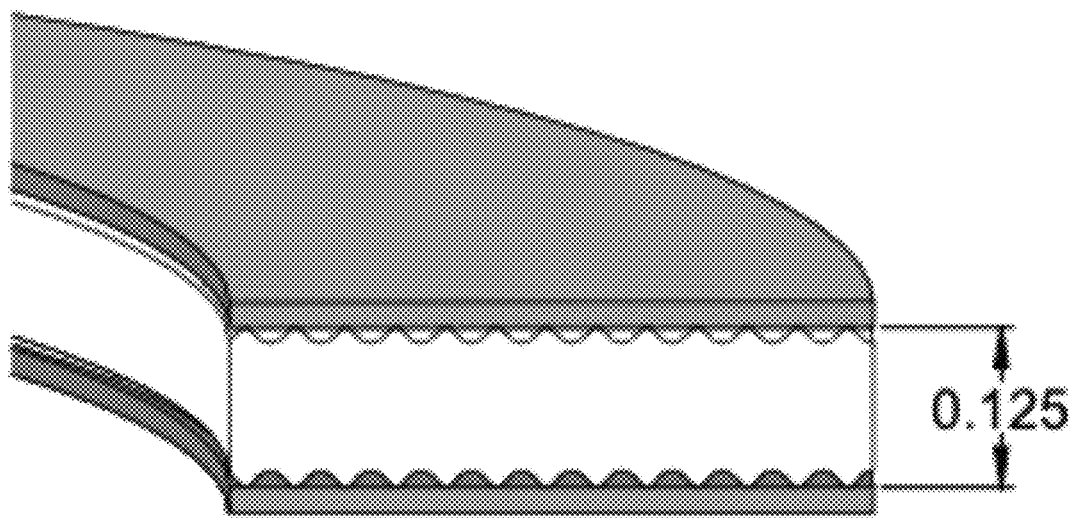
FIG. 25 is an illustration of a cross-section of a wire wound gasket.

FIG. 25 is an illustration of a cross-section of a wire wound gasket. The wire wound gasket can be made from inconel, so that it handles the heat, and coolant and corrosion much better. The inventor has discovered that such a gasket can last for 25,000 or more hours of use. In addition, the wire wound gasket can be configured to exert a spring force, e.g., a spring force that is equal to the OEM bolt torque requirement, so that if the bolts start to lose torque the gasket/seal will spring back against the sealing surfaces and maintain torque pressure and a seal even if original installation bolt torque is lost.

Although the invention has been described in detail with particular reference to these preferred embodiments, other embodiments can achieve the same results. Variations and modifications of the present invention are obvious to those skilled in the art and it is intended to cover all such modifications and equivalents.

What is claimed is:

1. A pre-combustion chamber assembly for use in an engine, wherein the engine defines a combustion chamber bounded in part by a cylinder head, with the head defining a coolant space separate from the combustion chamber, wherein the head has one more cylindrical holes extending from the coolant space to the combustion chamber, wherein the one or more holes have a first hole diameter facing the coolant space and a second hole diameter facing the combustion chamber, where the hole has a step-wise change in diameter from the first hole diameter to the second hole diameter at an axial location in between the coolant space and the combustion chamber, the pre-combustion chamber assembly comprising:
    (a) a body having a cylindrical end portion having a first portion with a first body diameter less than the first hole diameter and greater than the second hole diameter, and having a second portion with a second body diameter lesser than the second hole diameter, where the body has a step-wise change in diameter from the first body diameter to the second body diameter forming a shelf;
    (b) a tip that fits over the body, having a maximum diameter less than the second hole diameter, configured to be placed in communication with the combustion chamber;
    (c) a gasket having an inner diameter greater than the second body diameter and lesser than the first body diameter, and having an outer diameter lesser than the first hole diameter; mounted with the body around the first portion and adjacent the shelf; wherein the gasket comprises a wire wound washer.

2. The pre-combustion chamber assembly of claim 1, wherein the gasket comprises inconel.

3. The pre-combustion chamber assembly of claim 1, wherein the gasket exerts a spring force between the body and the head when compressed by mounting of the body in the engine.

4. An engine, comprising:
    (a) an engine block defining one or more combustion chambers;
    (b) a head mounted with the engine block and sealing an end of each of the one or more chambers, wherein the head is in contact with a coolant space, and wherein the head has one or more cylindrical holes extending from the coolant space to a combustion chamber, wherein the one or more holes have a first hole diameter facing the coolant space and a second hole diameter, lesser than the first hole diameter, facing the combustion chamber, where the hole has a step-wise change in diameter from the first hole diameter to the second hole diameter at an axial location between the coolant space and the combustion chamber;
    (c) a pre-combustion chamber assembly as in claim 1, mounted with the head such that the tip is in communication with one of the combustion chambers, and such that the gasket is compressed along the axis of the hole between the step-wise change in diameter of the hole and the shelf.

5. The engine of claim 4, wherein the gasket comprises inconel.

6. The engine of claim 4, wherein the gasket exerts a spring force between the body and the head when compressed by mounting of the body in the engine.

7. The engine of claim 4, wherein the pre-combustion chamber further comprises:
    (d) a sealing member ring having an inner diameter, a C-shaped cross-section having a width and a height, and an outer diameter equal to the inner diameter plus two times the width of the C-shaped cross-section;
    (e) wherein the body has a cylindrical end portion with an end portion diameter that allows the sealing member ring to be slid over the end portion and extending over an end portion distance from the end of the body, and having an intermediate portion with an intermediate portion diameter, greater than the sealing member ring inner diameter and extending an intermediate portion distance from the end portion;
    (f) wherein the tip's hollow shaft has a first shaft diameter that allows the shaft to be slid over the sealing member ring and extending a first distance from the end of the tip, and has a second shaft diameter, lesser than the first shaft diameter and greater than the body end portion diameter, extending a second distance from the end of the tip;
    (g) where the first distance is greater than the intermediate portion distance by at least the height of the sealing member ring cross-section;

(h) where the seal is disposed around the body end portion, proximal the location where the body intermediate portion begins, and seals between axial surfaces of the body end portion and the tip at the first shaft diameter, with the opening in the C-shaped cross-section facing toward the end of the body;

(i) where the second shaft diameter is greater than the body end portion outer diameter sufficient to allow gas from the combustion portion to impinge on the opening in the C-shaped cross-section of the sealing member ring and urge the C-shaped cross-section to expand and exert sealing force on the axial surfaces of the body end portion and the shaft at the tip's first inner diameter.

8. The engine of claim 7, wherein the sealing member ring further comprises a spring disposed within the C-shaped cross-section exerting force expanding the C-shaped cross-section.

9. The engine of claim 7, wherein the body is grooved at the transition between the intermediate portion and the end portion, with the sealing member ring disposed in such groove.

10. The engine of claim 7, wherein the tip is chamfered at the transition in the shaft between the first shaft diameter and the second shaft diameter.

11. The engine of claim 7, wherein said seal sealing member ring comprises an engineered metal seal.

12. The engine of claim 7, wherein said sealing member ring comprises an engineered metal seal with an energized spring.

13. The engine of claim 7, wherein said seal sealing member ring comprises a material including Inconel, Hastelloy, or titanium alloys.

* * * * *